US011677865B2

(12) United States Patent
Yang et al.

(10) Patent No.: US 11,677,865 B2
(45) Date of Patent: *Jun. 13, 2023

(54) TRANSMITTING APPARATUS AND SIGNAL PROCESSING METHOD THEREOF

(71) Applicant: SAMSUNG ELECTRONICS CO., LTD., Suwon-si (KR)

(72) Inventors: Hyun-Koo Yang, Seoul (KR); Sung-hee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

This patent is subject to a terminal disclaimer.

(21) Appl. No.: 17/344,395

(22) Filed: Jun. 10, 2021

(65) Prior Publication Data

US 2021/0306444 A1 Sep. 30, 2021

Related U.S. Application Data

(63) Continuation of application No. 16/446,159, filed on Jun. 19, 2019, now Pat. No. 11,057,503, which is a (Continued)

(30) Foreign Application Priority Data

Aug. 13, 2015 (KR) .................. 10-2015-0114331
Nov. 4, 2015 (KR) .................. 10-2015-0154332

(51) Int. Cl.
*H04L 69/22* (2022.01)
*H04L 45/74* (2022.01)
(Continued)

(52) U.S. Cl.
CPC ............. *H04L 69/22* (2013.01); *H04L 45/74* (2013.01); *H04L 69/04* (2013.01); *H04L 69/321* (2013.01);
(Continued)

(58) Field of Classification Search
CPC ....... H04L 69/321; H04L 69/22; H04L 69/04; H04L 69/324; H04L 45/74; H04L 69/323
See application file for complete search history.

(56) References Cited

U.S. PATENT DOCUMENTS 7,835,761 B2  11/2010  Gill et al.
8,145,969 B2   3/2012  Bauchot et al.
(Continued)

FOREIGN PATENT DOCUMENTS

CN  101079860 A  11/2007
CN  101416444 A   4/2009
(Continued)

OTHER PUBLICATIONS

Notice of Allowance dated Dec. 10, 2020 by the Korean Intellectual Property Office in counterpart Korean Patent Application No. 10-2019-0030757.

(Continued)

*Primary Examiner* — Chi Ho A Lee
(74) *Attorney, Agent, or Firm* — Sughrue Mion, PLLC

(57) ABSTRACT

A transmitting apparatus, a receiving apparatus, and a method of signal processing are provided. The transmitting apparatus includes at least one processor configured to implement: a packet generator which generates a packet including a header and a payload, based on an input stream; and a signal processor which signal-processes the generated packet. The header includes a base header, and the base header includes various fields indicating at least one of a packet type, and a value indicating that the packet transmits one single complete input packet, a segment of an input packet, or a plurality of input packets. The fields included in the base header may also indicate presence of an additional header and a substream identifier.

4 Claims, 52 Drawing Sheets

Related U.S. Application Data continuation of application No. 15/905,404, filed on Feb. 26, 2018, now Pat. No. 10,334,088, which is a continuation of application No. 14/932,320, filed on Nov. 4, 2015, now Pat. No. 9,948,753.

(60) Provisional application No. 62/083,971, filed on Nov. 25, 2014, provisional application No. 62/074,759, filed on Nov. 4, 2014.

(51) Int. Cl.
*H04L 69/04* (2022.01)
*H04L 69/324* (2022.01)
*H04L 69/321* (2022.01)
*H04N 21/235* (2011.01)
*H04L 69/323* (2022.01)

(52) U.S. Cl.
CPC ......... *H04L 69/324* (2013.01); *H04N 21/235* (2013.01); *H04L 69/323* (2013.01)

(56) References Cited

U.S. PATENT DOCUMENTS

| | | | |
|---|---|---|---|
| 8,711,771 | B2 | 4/2014 | Das et al. |
| 8,891,465 | B2 | 11/2014 | Park et al. |
| 9,100,379 | B2 | 8/2015 | Hirayama et al. |
| 9,167,281 | B2 | 10/2015 | Petrov et al. |
| 9,854,279 | B2 | 12/2017 | Petrov et al. |
| 10,523,731 | B2 | 12/2019 | Kwon et al. |
| 2005/0288050 | A1 | 12/2005 | Gill et al. |
| 2008/0008175 | A1 | 1/2008 | Park |
| 2008/0019391 | A1 | 1/2008 | Breitkreutz |
| 2008/0056273 | A1 | 3/2008 | Pelletier et al. |
| 2009/0003445 | A1 | 1/2009 | Ying et al. |
| 2009/0052519 | A1 | 2/2009 | Oh et al. |
| 2009/0138932 | A1 | 5/2009 | Bauchot et al. |
| 2009/0161795 | A1 | 6/2009 | Oh et al. |
| 2009/0307727 | A1 | 12/2009 | Thesling |
| 2010/0226315 | A1 | 9/2010 | Das et al. |
| 2010/0254259 | A1 | 10/2010 | Singh et al. |
| 2010/0316052 | A1 | 12/2010 | Petersen |
| 2011/0194439 | A1 | 8/2011 | Maze et al. |
| 2012/0027211 | A1 | 2/2012 | Lehtovirta et al. |
| 2012/0063407 | A1 | 3/2012 | Park et al. |
| 2012/0189008 | A1 | 7/2012 | Tzvetkov |
| 2012/0281699 | A1 | 11/2012 | Jia et al. |
| 2012/0307842 | A1 | 12/2012 | Petrov et al. |
| 2013/0294347 | A1 | 11/2013 | Das et al. |
| 2013/0297817 | A1 | 11/2013 | Bae et al. |
| 2013/0308655 | A1 | 11/2013 | Hirayama et al. |
| 2013/0343276 | A1 | 12/2013 | Charpentier et al. |
| 2015/0363160 | A1 | 12/2015 | Riedmiller et al. |
| 2016/0037192 | A1 | 2/2016 | Petrov et al. |
| 2016/0212503 | A1 | 7/2016 | Kwon et al. |
| 2016/0227005 | A1 | 8/2016 | Kwon et al. |
| 2016/0294914 | A1 | 10/2016 | Kwon et al. |
| 2016/0373807 | A1 | 12/2016 | Kwak et al. |
| 2017/0230863 | A9 | 8/2017 | Das et al. |
| 2018/0083874 | A1 | 3/2018 | Kwon et al. |

FOREIGN PATENT DOCUMENTS

| | | |
|---|---|---|
| CN | 101442400 A | 5/2009 |
| CN | 101969608 A | 2/2011 |
| CN | 102334324 A | 1/2012 |
| CN | 102439967 A | 5/2012 |
| CN | 102598624 A | 7/2012 |
| CN | 102860023 A | 1/2013 |
| CN | 103428544 A | 12/2013 |
| EP | 2 026 523 A1 | 2/2009 |
| EP | 2 362 650 A1 | 8/2011 |
| EP | 3026918 A1 | 6/2016 |
| EP | 3182712 A1 | 6/2017 |
| KR | 10-2008-0114837 A | 12/2008 |
| WO | 01/05098 A1 | 1/2001 |
| WO | 2008/004826 A1 | 1/2008 |
| WO | 2011/062425 A2 | 5/2011 |

OTHER PUBLICATIONS

International Search Report for PCT/KR2015/011799 dated Feb. 15, 2016 [PCT/ISA/210].
Written Opinion for PCT/KR2015/011799 dated Feb. 15, 2016 [PCT/ISA/237].
"Digital Video Broadcasting (DVB); Generic Stream Encapsulation (GSE); Part 1: Protocol", Technical Specification, European Telecommunications Standards Institute (ETSI), 650, Route Des Lucioles; F-06921 Sophia-Antipolis; France, vol. BROADCAS, No. V1.2.1, Jul. 1, 2014, XP014214603, (36 pages total).
Fairhurst University of Aberdeen B Collini-Nocker University of Salzburg G Extension Formats for Unidirectional Lightweight Encapsulation (ULE) and the Generic Stream Encapsulation (GSE); rfc5163.txt:, Network Working Group RFC 1717, Internet Society (ISOC) 4, Rue Des Falises CH-1205 Geneva, Switzerland, CH, Apr. 1, 2008 (Apr. 1, 2008), XP015055233, pp. 1-18, (18 pages total).
"Digital Video Broadcasting (DVB); Generic 1-15 Stream Encapsulation (GSE); Part 2: Logical Link Control (LLC)", Technical Specification, European Telecommunications Standards Institute (ETSI), 650, Route Des Lucioles; F-06921 Sophia-Antipolis; France, vol. BROADCAS, No. V1.1.1, Jul. 1, 2014, XP014214604, pp. 1-40, (40 pages total).
Communication dated Feb. 23, 2018 issued by the Canadian Patent Office in counterpart Canadian Patent Application No. 2966728.
Communication dated Jun. 24, 2020, from the Intellectual Property Office of India in Application No. 201717017515.
Communication dated Sep. 4, 2019 issued by the State Intellectual Property Office of P.R. China in counterpart Chinese Application No. 201580059821.5.
Communication dated Nov. 22, 2019 issued by the European Intellectual Property Office in counterpart European Application No. 19191882.0.
"T-DMB technology and its application", TV Engineering, China Academic Journal Electronic Publishing House, No. 2, 2006, pp. 12-14, 4 pages total.
Communication dated Sep. 22, 2017, issued by the European Patent Office in counterpart European Application No. 15857025.9.
Communication dated Dec. 1, 2021 issued by the State Intellectual Property Office of P.R. China in counterpart Chinese application No. 202010395866.2.
Communication dated Dec. 1, 2021 issued by the State Intellectual Property Office of P.R. China in counterpart Chinese application No. 202010395873.2.
Wang Wei, "MPLS in the Application of MSTP", China Academic Journal Electronic Publishing House, DOI:10.13992/j.cnki.tetas, Aug. 2006, 4 pages total.

FIG. 24

| Syntax | No. of bits | Mnemonic |
|---|---|---|
| BBP_Header() { | | |
| TYPE | 3 | bslbf |
| MODE | 1 | bslbf |
| LENGM | 1 | bslbf |
| LENGLSB | 11 | uimsbf |
| LABELI | 1 | bslbf |
| EXTHI | 1 | bslbf |
| EXTHLM | 1 | bslbf |
| S | 1 | bslbf |
| C | 1 | bslbf |
| if (S == "1") { | | |
| Seg_ID | 3 | uimsbf |
| Seg_SN | 4 | uimsbf |
| if (Seg_SN == "0000") { | | |
| FRAGTOTAL | 16 | uimsbf |
| } | | |
| reserved | 4 | bslbf |
| } | | |
| else if (C=="1") { | | |
| Count | 2 | uimsbf |
| LM | 1 | bslbf |
| for (i=0;i<Count;i++){ | | |
| if(LM=="0"){ | | |
| Length_short | 11 | uimsbf |

| Syntax | No. of bits | Mnemonic |
|---|---|---|
| } else { | | |
| Length_long | 16 | uimsbf |
| } | | |
| } | | |
| reserved | var | bslbf |
| } | | |
| else { | | |
| reserved | 3 | bslbf |
| } | | |
| if (LENGM == "1") { | | |
| LENGMSB | 8 | uimsbf |
| } | | |
| if (LABELI == "1") { | | |
| LABEL | 16 | uimsbf |
| } | | |
| if (EXTHLM == "1") { | | |
| EXTHL | 8 | uimsbf |
| } | | |
| else{ | | |
| EXTHL | 16 | uimsbf |
| } | | |
| EXTH | EXTHL*8 | |
| } | | |

3100

TRANSMITTING APPARATUS AND SIGNAL PROCESSING METHOD THEREOF

CROSS-REFERENCE TO THE RELATED APPLICATIONS

This is a Continuation of U.S. application Ser. No. 16/446,159 filed Jun. 19, 2019, which is a Continuation Application of U.S. application Ser. No. 15/905,404 filed Feb. 26, 2018 as a Continuation Application of U.S. application Ser. No. 14/932,320 filed Nov. 4, 2015, which claims priorities from Korean Patent Application No. 10-2015-0114331 and 10-2015-0154332 filed on Aug. 13, 2015 and Nov. 4, 2015 respectively, in the Korean Intellectual Property Office, and U.S. Provisional Application Ser. Nos. 62/074,759 and 62/083,971 filed on Nov. 4, 2014 and Nov. 25, 2014, respectively, the disclosures of which are incorporated herein in their entireties by reference.

BACKGROUND

1. Field of the Invention

Apparatuses and methods consistent with the exemplary embodiments described herein relate to a transmitting apparatus which transmits data by mapping the data to at least one signal processing path and a signal processing method corresponding thereto.

2. Description of the Related Art

In the information-oriented society of the $21^{st}$ century, broadcasting communication services are entering an era of digitization, multi-channel, broadband, and high quality. In particular, as high-quality digital television (TV), portable multimedia player (PMP), and portable broadcasting apparatuses have been increasingly used in recent years, there is an increasing demand for digital broadcasting services that are able to support various receiving methods. Further, there is also an increasing demand for data transmission of various pockets constituted by a moving picture experts group (MPEG)2-transport stream (TS) packet which is traditionally used through a broadcasting network and an Internet protocol based packet.

In an actual state in which the standard group has established various standards according to the demand to provide various services to satisfy user's needs, developing a method of providing better services through more excellent performance by using universal data is required.

SUMMARY

Exemplary embodiments of the inventive concept may overcome the above disadvantages and other disadvantages not described above. However, the inventive concept is not required to overcome the disadvantages described above, and the exemplary embodiments may not overcome any of the problems described above.

The exemplary embodiments provide a transmitting apparatus and a receiving apparatus which generate, transmit and/or receive a frame having a format suitable for transmitting/receiving various types of data and a control method thereof.

According to an exemplary embodiment, there is provided a transmitting apparatus which may include at least one processor configured to implement: a packet generator which generates a packet including a header and a payload, based on an input stream; and a signal processor which signal-processes the generated packet. The header may include a base header which includes: a first field indicating a packet type of the input stream; and a second field which is set to a first value representing that the packet transmits one single complete input packet or a second value representing that the packet transmits a segment of an input packet or a plurality of input packets. When the second field is set to the first value, the base header includes a third field which is set to a third value indicating that an additional header is not present or a fourth value indicating that the additional header is present. When the third field is set to the fourth value, the additional header includes a fourth field indicating whether a substream identifier is present in an optional header, and when the fourth field is set to a value indicating that the substream identifier is present in the optional header, the optional header includes a fifth field indicating the substream identifier.

According to another exemplary embodiment, there is provided a signal processing method of a transmitting apparatus. The method may include: generating a packet including a header and a payload based on an input stream; and signal-processing the generated packet. The header may include a base header which includes: a first field indicating a packet type of the input stream; and a second field which is set to a first value representing that the packet transmits one single complete input packet or a second value representing that the packet transmits a segment of an input packet or a plurality of input packets. When the second field is set to the first value, the base header includes a third field which is set to a third value indicating that an additional header is not present or a fourth value indicating that the additional header is present. When the third field is set to the fourth value, the additional header includes a fourth field indicating whether a substream identifier is present in an optional header, and when the fourth field is set to a value indicating that the substream identifier is present in the optional header, the optional header includes a fifth field indicating the substream identifier.

According to the various exemplary embodiments, since an input stream can be efficiently mapped to a physical layer, data processing efficiency can be improved.

Additional and/or other aspects and advantages of the invention will be set forth in part in the description which follows and, in part, will be obvious from the description, or may be learned by practice of the exemplary embodiments.

BRIEF DESCRIPTION OF THE DRAWINGS

The above and/or other aspects of the inventive concept will be more apparent by describing certain exemplary embodiments with reference to the accompanying drawings, in which:

FIGS. 16A to 33 are diagrams illustrating a structure of a header of an ALP packet, according to various exemplary embodiments;

DETAILED DESCRIPTION OF THE
EXEMPLARY EMBODIMENTS

Hereinafter, diverse exemplary embodiments of the inventive concept will be described in detail with reference to the accompanying drawings.

An apparatus and a method proposed in the exemplary embodiments can be, of course, applied to various communication systems including mobile broadcasting services including a digital multimedia broadcasting (DMB), (hereinafter, referred to as 'DMB') service, digital video broadcasting handheld (DVP-H) (hereinafter, referred to as 'DVP-H'), an advanced television systems committee mobile/handheld (ATSC-M/H) (hereinafter, referred to as 'ATSC-M/H') service, an Internet protocol television (IPTV) (hereinafter, referred to as 'IPTV'), and the like, communication systems including a moving picture experts group (MPEG) media transport (MMT) (hereinafter, referred to as 'MMT') system, an evolved packet system (EPS) (hereinafter, referred to as 'EPS'), a long-terms evolution (LTE) (hereinafter, referred to as 'LTE') mobile communication system, a long-term evolution-advanced (LTE-A) (hereinafter, referred to as 'LTE-A') mobile communication system, a high speed downlink packet access (HDSPA) (hereinafter, referred to as 'HSDPA') mobile communication system, a high speed uplink packet access (HSUPA) (hereinafter, referred to as 'HSUPA') mobile communication system, a 3$^{rd}$ generation project partnership 2 (3GPP2) (hereinafter, referred to as '3GPP2') high rate packet data (HRPD) (hereinafter, referred to as 'HRPD') mobile communication system, a 3GPP2 wideband code division multiple access (WCDMA) (hereinafter, referred to as 'WCDMA') mobile communication system, a 3GPP2 code division multiple access (CDMA) (hereinafter, referred to as 'CDMA') mobile communication system, an Institute of Electrical and Electronics Engineers (IEEE) (hereinafter, referred to as 'IEEE') 802.16m communication system, a mobile Internet protocol (Mobile IP) (hereinafter, referred to as 'Mobile IP') system, and the like.

Figure 1:
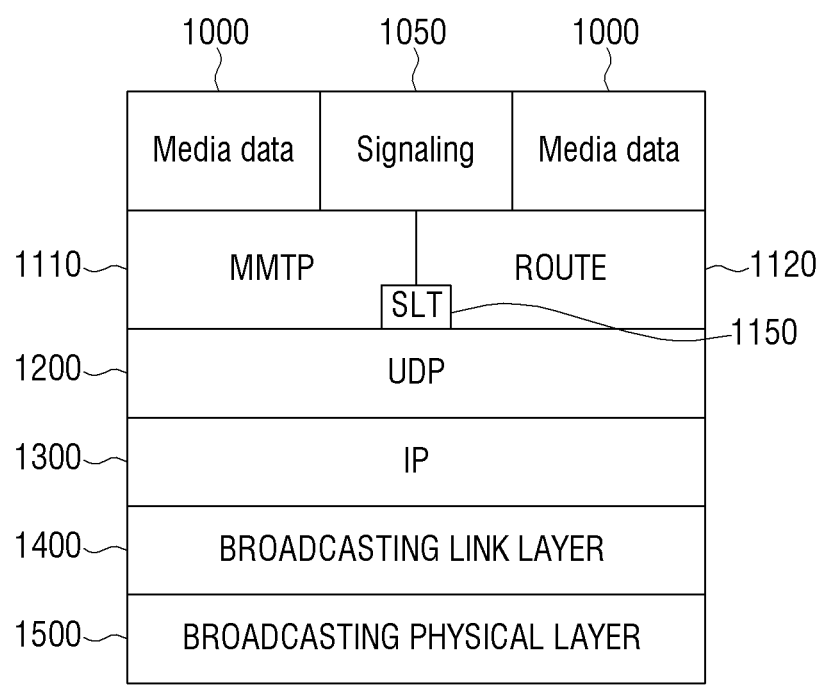
FIG. 1 is a diagram illustrating a hierarchical structure of a transmitting system, according to an exemplary embodiment.

FIG. 1 is a diagram illustrating a hierarchical structure of a transmitting system, according to an exemplary embodiment.

Referring to FIG. 1, a service is constituted at least by media data 1000 and signaling 1050 for transferring information required to acquire and consume the media data at a receiver. The media data may be encapsulated in a format suitable for transmission prior to the transmission. An encapsulation method may follow a Media Processor (MPU) defined in ISO/IEC 23008-1 MPEG Media Transport (MMT) or a DASH segment format defined in ISO/IEC 23009-1 Dynamic Adaptive Streaming over HTTP (DASH). The media data 1000 and the signaling 1050 are packetized according to an application layer protocol.

FIG. 1 illustrates a case in which an MMT protocol (MMTP) 1110 defined in the MMT and a Real-Time Object Delivery over Unidirectional Transport (ROUTE) protocol 1120 are used as the application layer protocol. In this case, a method for notifying information on an application protocol, in which a service is transmitted, by an independent method different from the application layer protocol is required for the receiver to know by which application layer protocol the service is transmitted.

A service list table (SLT) 1150 illustrated in FIG. 1 represents a signaling method in which information on the service is constituted by a table and packetized for satisfying the aforementioned object. Detailed contents of the SLT will be described below. The packetized media data and the signaling including the SLT are transferred to a broadcasting link layer 1400 through a user datagram protocol (UDP) 1200 and an Internet protocol (IP) 1300. An example of the broadcasting link layer 1400 includes an ATSC 3.0 link-layer protocol (ALP) defined in the ATSC 3.0 standard (hereafter, referred to as 'ATSC 3.0'). The ALP protocol generates an ALP packet by using an IP packet as an input, and transfers the ALP packet to a broadcasting physical layer 1500.

However, according to FIG. 2 to be described below, it is noted that the broadcasting link layer 1400 does not use only the IP packet 1300 including the media data and/or the signaling as the input, and instead, may use an MPEG2-TS packet or general formatted packetized data as the input. In this case, signaling information required to control the broadcasting link layer is also transferred to the broadcasting physical layer 1500 in the form of the ALP packet.

The broadcasting physical layer 1500 generates a physical layer frame by signal-processing the ALP packet as the input, converts the physical layer frame into a radio signal, and transmits the radio signal. In this case, the broadcasting physical layer 1500 has at least one signal processing path. An example of the signal processing path may include a physical layer pipe (PLP) of ATSC 3.0 or the Digital Video Broadcasting—Second Generation Terrestrial (DVB-T2) standard, and one or more services or some of the services may be mapped to the PLP.

Figure 2:
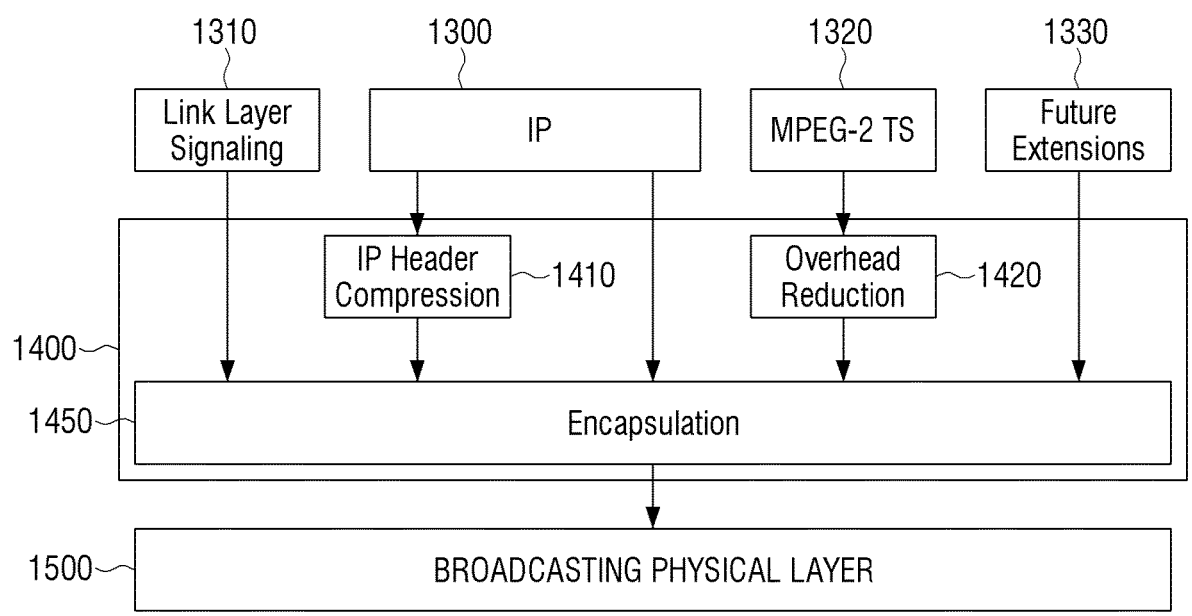
FIG. 2 is a diagram illustrating a schematic configuration of a broadcasting link layer, according to the exemplary embodiment.

FIG. 2 is a diagram illustrating a schematic configuration of the broadcasting link layer 1400, according to an exemplary embodiment.

Referring to FIG. 2, the input of the broadcasting link layer 1400 includes the IP packet 1300, and may further include link layer signaling 1310, an MPEG2-TS packet 1320, and other packetized data 1330.

Input data may be subjected to additional signal processing based on the type of the input data before ALP packetization 1450. As an example of the additional signal processing, the IP packet 1300 may be subjected to an IP header compression process 1410 and the MPEG2-TS packet may be subjected to an overhead reduction process 1420. During the ALP packetization, input packets may be subjected to dividing and merging processes.

Figure 3A:
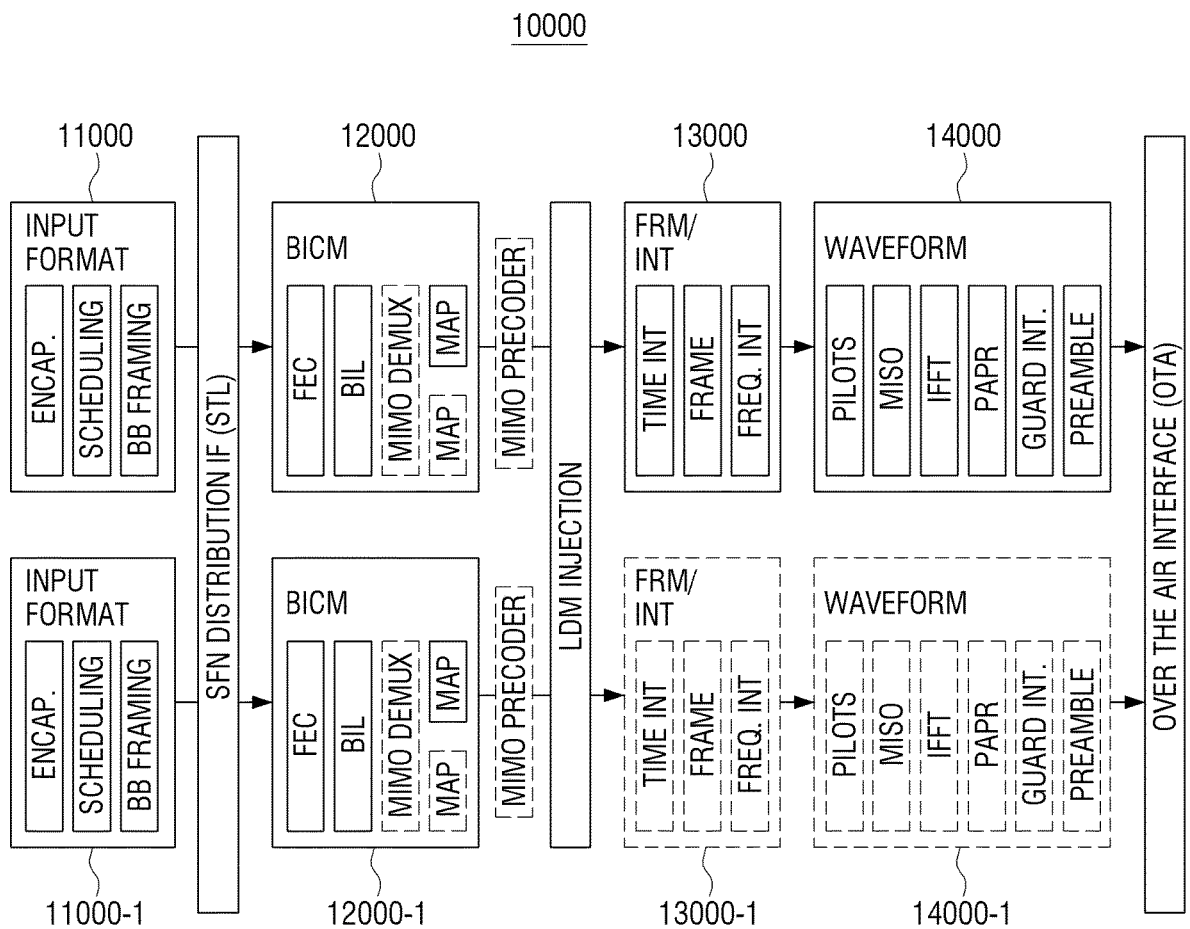
FIG. 3A is a diagram illustrating a schematic configuration of a transmitting system or a transmitting apparatus, according to an exemplary embodiment.

FIG. 3A is a diagram illustrating a schematic configuration of a transmitting system or a transmitting apparatus, according to an exemplary embodiment. According to FIG. 3A, a transmitting system 10000 according to the exemplary embodiment may include input formatting blocks 11000 and 11000-1, bit interleaved and coded modulation (BICM) blocks 12000 and 12000-1, framing/interleaving blocks 13000 and 13000-1, and waveform generation blocks 14000 and 14000-1.

The input formatting blocks 11000 and 11000-1 generate a baseband packet from an input stream of data to be serviced. Herein, the input stream may be a transport stream (TS), Internet packets (IP) (e.g., IPv4 and IPv6), an MPEG media transport (MMT), a generic stream (GS), generic stream encapsulation (GSE), and the like. For example, an ATSC 3.0 link-layer protocol (ALP) packet may be generated based on the input stream, and the baseband packet may be generated based on the generated ALP packet.

The bit interleaved and coded modulation (BICM) blocks 12000 and 12000-1 determine an forward error correction (FEC) coding rate and a constellation order according to an area (fixed PHY frame or mobile PHY frame) to which the data to be serviced will be transmitted, and perform encoding and time interleaving. Meanwhile, signaling information for the data to be serviced may be encoded through a separate BICM encoder according to user implementation or encoded by sharing a BICM encoder with the data to be serviced.

The framing/interleaving blocks 13000 and 13000-1 combine the time-interleaved data with a signaling signal including the signaling information to generate a transmission frame.

The waveform generation blocks 14000 and 14000-1 generate an orthogonal frequency-division multiplexing (OFDM) signal in a time domain for the generated transmission frame, modulate the generated OFDM signal into an RF signal, and transmit the RF signal to a receiver.

The transmitting system 10000 according to the exemplary embodiment illustrated in FIG. 3A includes normative blocks marked with a solid line and informative blocks marked with dotted lines. Herein, the blocks marked with the solid line are normal blocks, and the blocks marked with the dotted lines are blocks which may be used when informative multiple-input multiple-output (MIMO) is implemented.

Figure 3B:
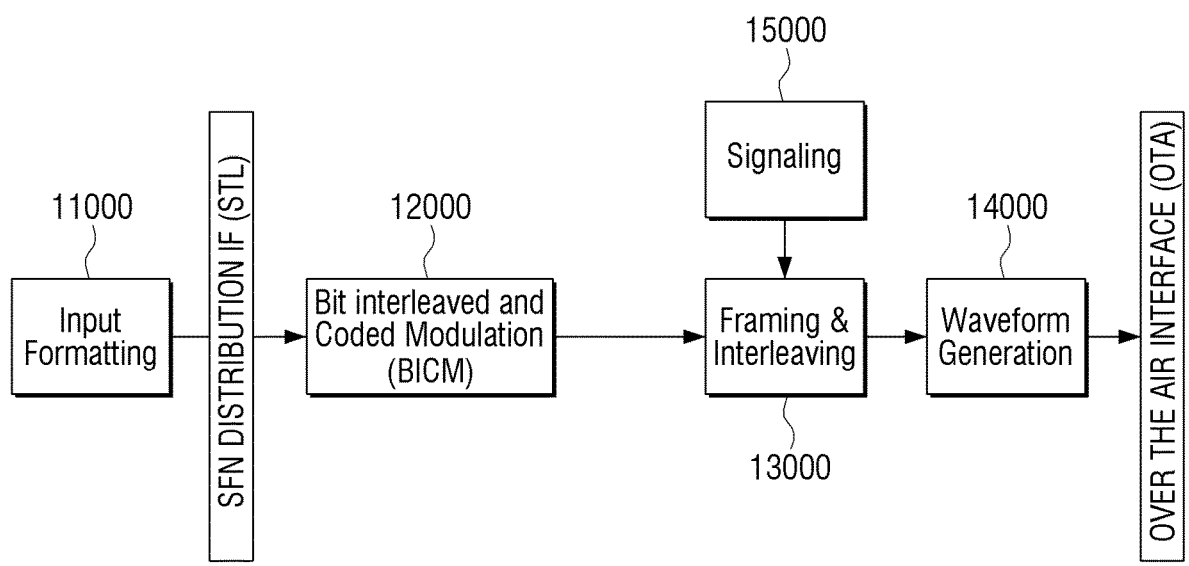
FIGS. 3B and 3C are diagrams illustrating a multiplexing method, according to exemplary embodiments.
Figure 3C:
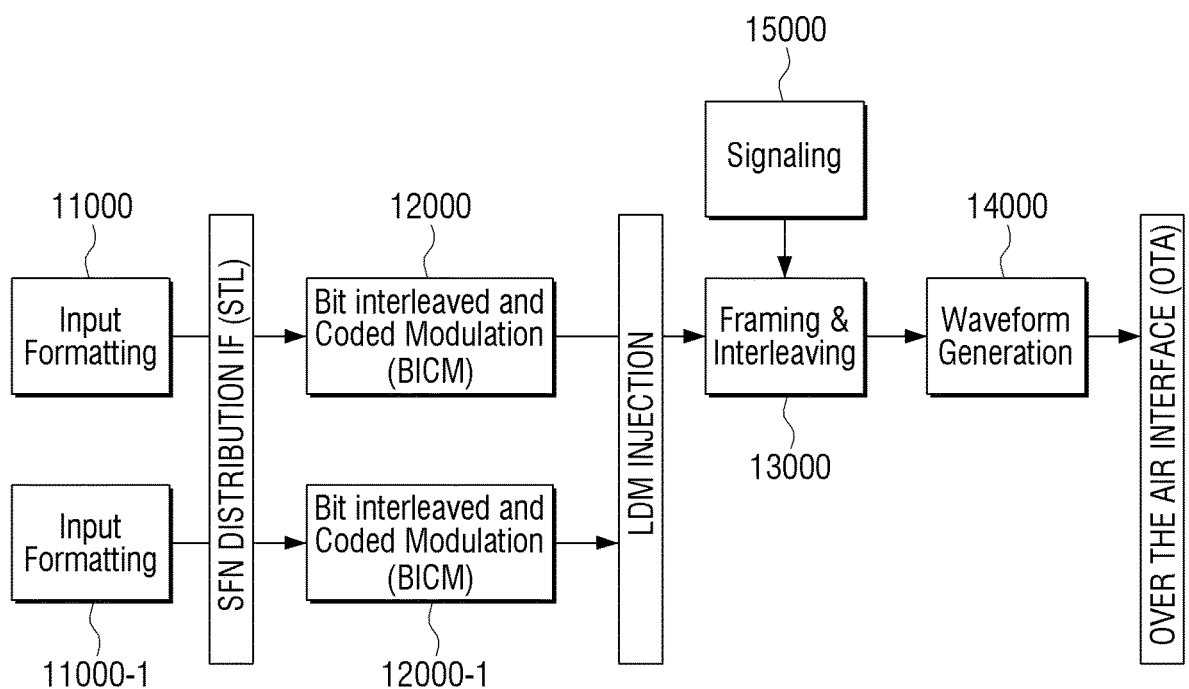

FIGS. 3B and 3C are diagrams illustrating a multiplexing method, according to exemplary embodiments.

FIG. 3B illustrates a block diagram for implementing time division multiplexing (TDM), according to an exemplary embodiment.

A TDM system architecture includes four main blocks (alternatively, parts) of the input formatting block 11000, the BICM block 12000, the framing/interleaving block 13000, and the waveform generation block 14000.

Data is input and formatted in the input formatting block 11000 and forward error correction is applied the data in the BICM block 12000. Next, the data is mapped to a constellation. Subsequently, the data is time and frequency-interleaved in the framing/interleaving block 13000 and a frame is generated. Thereafter, an output waveform is generated in the waveform generation block 14000.

FIG. 3C illustrates a block diagram for implementing layered division multiplexing (LDM), according to an exemplary embodiment.

An LDM system architecture includes several other blocks as compared with the TDM system architecture. In detail, two separated input formatting blocks 11000 and 11000-1 and the BCIM blocks 12000 and 12000-1 for one of respective layers of the LDM are included in the LDM system architecture. The blocks are combined in an LDM injection block before the framing/interleaving block 13000. And, the waveform generation block 14000 is similar to the TDM.

Figure 4:
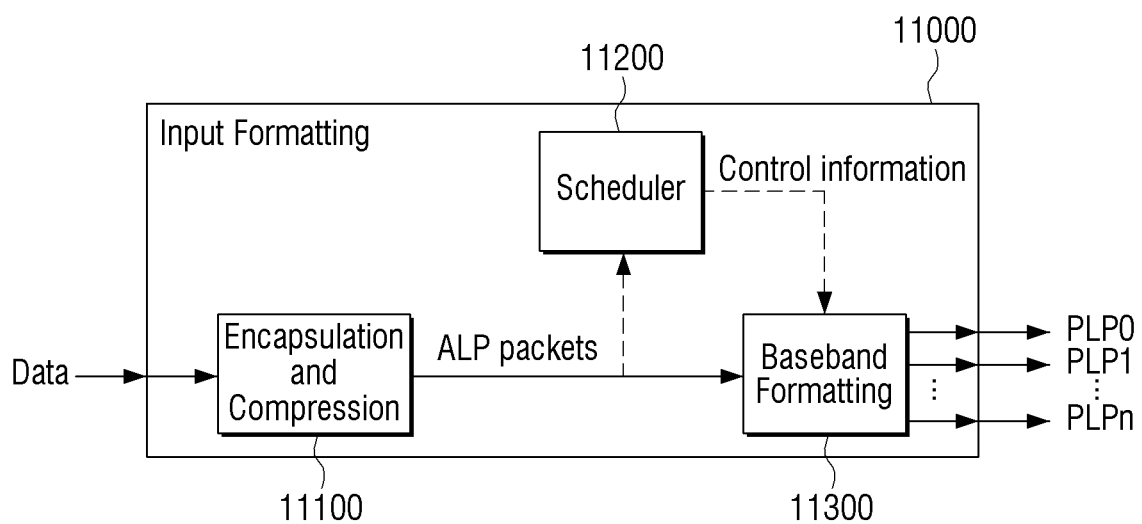
FIGS. 4 to 5B are block diagrams illustrating a detailed configuration of an input formatting block illustrated in FIG. 3A.

FIG. 4 is a block diagram illustrating a detailed configuration of the input formatting block illustrated in FIG. 3A, according to an exemplary embodiment.

As illustrated in FIG. 4, the input formatting block 11000 includes three blocks that control packets distributed to PLPs. In detail, the input formatting block 11000 includes an encapsulation and compression block 11100, a baseband formatting block (alternatively, baseband framing block) 11300, and a scheduler block 11200.

An input stream input to the encapsulation and compression block 11100 may be various types. For example, the input stream may be a transport stream (TS), an Internet packets (IP) (e.g., IPv4 and IPv6), an MPEG media transport (MMT), a generic stream (GS), a generic stream encapsulation (GSE), and the like.

Packets output from the encapsulation and compression block 11100 become ALP packets (generic packets) (also referred to as L2 packets). Herein, a format of an ALP packet may be one of the Type Length Value (TLV), the GSE, and the ALP.

The length of each ALP packet is variable. The length of the ALP packet may be easily extracted from the ALP packet itself without additional information. The maximum length of the ALP packet is 64 kB. The maximum length of a header of the ALP packet is 4 bytes. The ALP packet has a length of integer bytes.

The scheduler block 11200 receives an input stream including the encapsulated ALP packets to form physical layer pipes (PLPs) in a baseband packet form. In the TDM system, only one PLP called a single PLP (S-PLP) or multiple PLPs (M-PLP) may be used. One service may not use four or more PLPs. In the LDM system constituted by two layers, one in each layer, that is, two PLPs are used.

The scheduler block 11200 receives the encapsulated ALP packets to designate how the encapsulated ALP packets are allocated to physical layer resources. In detail, the scheduler block 11200 designates how the baseband formatting block 1130 outputs a baseband packet.

A function of the scheduler block 11200 is defined by a data size and a time. A physical layer may transmit some of data in the distributed time. The scheduler block generates a solution which is suitable in terms of a configuration of a physical layer parameter by using inputs and information such as constraints and configuration from an encapsulated data packet, the quality of service metadata for the encapsulated data packet, a system buffer model, and system management. The solution is targets of a configuration and a control parameter which are usable and an aggregate spectrum.

Meanwhile, an operation of the scheduler block 11200 is constrained to a set of dynamic, quasi-static, and static components. Definition of the constraint may vary according to user implementation.

Further, a maximum of four PLPs may be used with respect to each service. A plurality of services which include a plurality of types of interleaving blocks may be implemented by up to a maximum of 64 PLPs with respect to a bandwidth of 6, 7, or 8 MHz.

Figure 5A:
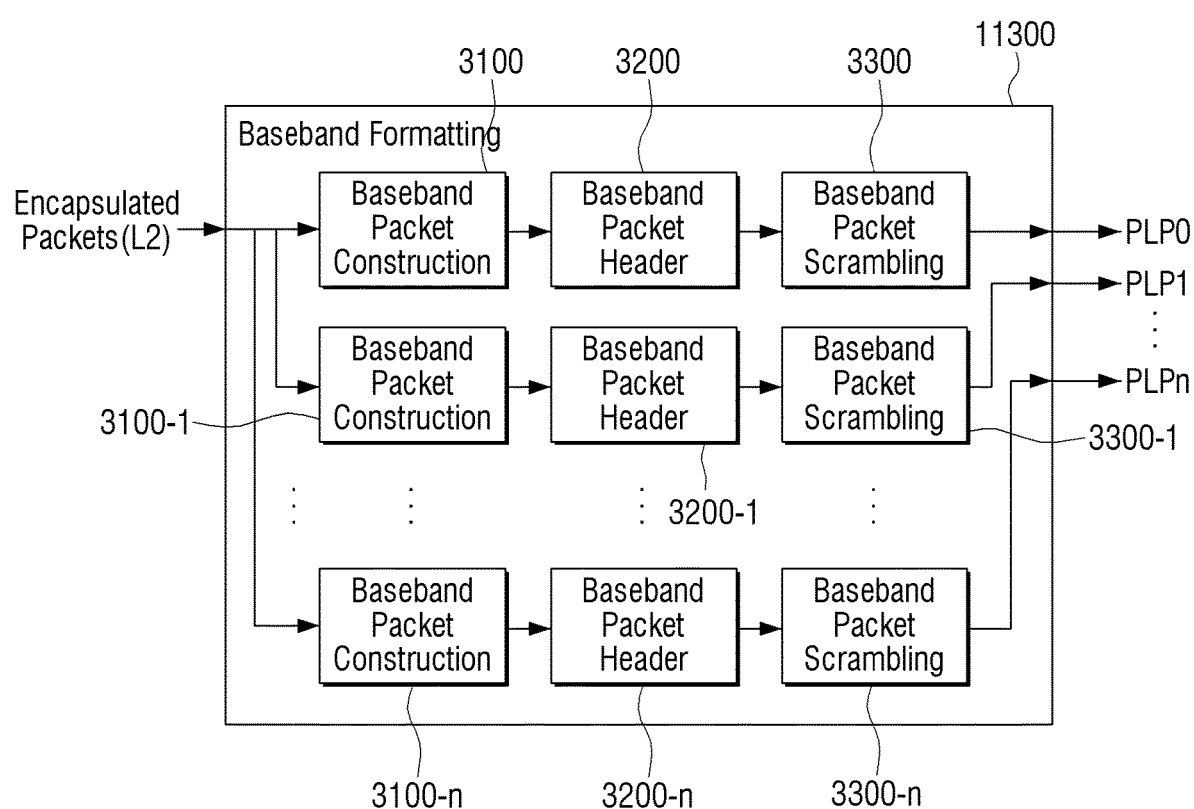

The baseband formatting block 11300 includes baseband packet construction blocks **3100, 3100-1, . . . 3100-*n*, baseband packet header construction blocks 3200, 3200-1, . . . 3200-*n*, and baseband packet scrambling blocks 3300, 3300-1, . . . , 3300-*n*, as illustrated in FIG. 5A**. In an M-PLP operation, the baseband formatting block generates a plurality of PLPs as necessary.

Figure 5B:
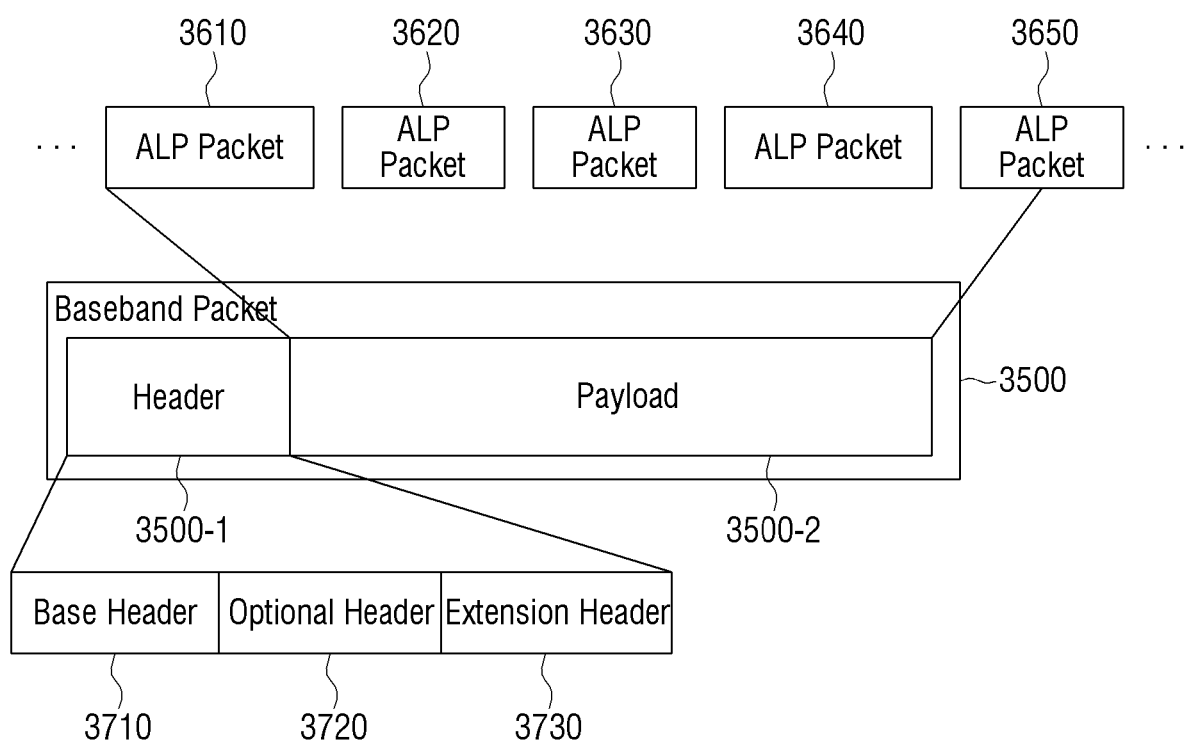

The baseband packet construction blocks **3100, 3100-1, . . . , 3100-*n* construct baseband packets. Each baseband packet 3500 includes a header 3500-1 and a payload 3500-2 as illustrated in FIG. 5B. A baseband packet is fixed to a length Kpayload. ALP packets 3610 to 3650 are sequentially mapped to a baseband packet 3500. When the ALP packets 3610 to 3650 do not completely fit in the baseband packet 3500**, these packets are distributed between a current baseband packet and a next baseband packet. The ALP packets are distributed in a unit of a byte.

The baseband packet header construction blocks **3200, 3200-1, . . . , 3200-*n* construct a header 3500-1. The header 3500-1 includes three parts, that is, a base field (a base header) 3710, an optional field (an optional header) 3720, and an extension field (an extension header) 3730, as illustrated in FIG. 5B. Herein, the base field 3710 is shown in every baseband packet and the optional field 3720 and the extension field 3730** may not be shown in every baseband packet.

A main function of the base field 3710 provides a pointer of an offset value as bytes to indicate a start of a next ALP packet in a baseband packet. When an ALP packet starts a baseband packet, the value of the pointer becomes 0. When there is no ALP packet that starts in the baseband packet, the value of the pointer may be 8191 and a base header of 2 bytes may be used.

The extension field 3730 may be used afterwards and for example, used for a baseband packet counter, baseband packet time stamping, additional signaling, and the like.

The baseband packet scrambling blocks **3300, 3300-1, . . . , 3000-*n*** scramble the baseband packet.

Like a case in which payload data mapped to the constellation is configured by a repetitive sequence, payload data is continuously scrambled before direction error correction encoding so as to prevent continuous mapping to a same point.

Figure 6:
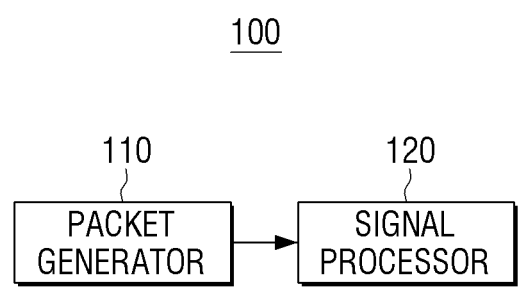
FIG. 6 is a block diagram illustrating a configuration of a transmitting apparatus according to an exemplary embodiment.

FIG. 6 is a block diagram illustrating a configuration of a transmitting apparatus according to an exemplary embodiment.

Referring to FIG. 6, a transmitting apparatus 100 includes a packet generator 110 and a signal processor 120.

The packet generator 110 may generate packets for encapsulating and transmitting an input IP packet, TS packet, and various types of data to respective PLPs. Here, the packets correspond to the L2 packet in an ISO 7 layer model.

In detail, the packet generator 110 may generate a packet including a header and a payload (or data payload), for example, an ALP packet which is a generic packet, (also referred to as an L2 packet) based on the input stream. Here, the header may include information on the payload included in a corresponding packet and information on a packet, which is included in the corresponding packet. Hereinafter, the packets generated by the packet generator 110 will be referred to as the ALP packet for easy description.

In general, the payload included in the ALP packet may include one of the Internet protocol (IP) packet, the TS packet, and the signaling packet or a combination thereof. However, data included in the payload is not limited to the aforementioned example and the payload may include various types of data. Herein, an ALP packet may be regarded as a unit packet required for mapping various types of data to the physical layer.

In detail, the packet generator 110 may generate the ALP packet including the header, and the header may include a field indicating a packet type of the input data transmitted in the payload and a field indicating whether the ALP packet transmits a normal (complete) input packet, that is, a service data unit (SDU).

In detail, the base header constituting the header includes a first field indicating the packet type of the input data and a second field indicating whether the ALP packet transmits one single complete input packet. Herein, the second field may be set to a first value indicating that the ALP packet transmits one single complete input packet or a second value indicating that the ALP packet transmits a segment of an input packet or a plurality of input packets. For example, the second field may be a payload_configuration (PC) field.

Further, when the second field is set to the first value, the base header may further include a third field which is set to a third value indicating that an additional header is not present and a fourth value indicating that the additional header is present. Here, the additional header may be a header that is present just after the base header. For example, the third field may be a header_mode (HM) field.

Further, when the third field is set to the fourth value, the additional header may include a fourth field indicating whether a substream identifier is present in an optional header. Herein, the optional header may be a header which is present just after the additional header and is a field for substream identification and/or header extension.

In this case, when the fourth field is set to a value indicating that the substream identifier is present in the optional header, the optional header may include a fifth field indicating the substream identifier. Herein, the fourth field may be a substream identifier flag (SIF) field, and the fifth field may be a substream identifier (SID) field. Herein, the SID field may be implemented by an 8-bit field indicating a substream identifier of the ALP packet. When the optional header extension is present, the SID may be present between the additional header and the optional header extension. Herein, the substream identifier is used to filter a specific packet including a substream corresponding to a specific service in at least one packet that transmits multiple services. For example, the substream identifier may be information on a substream address.

In detail, the optional header for the substream identification is used to filter a specific packet stream in a link layer. As one example, the substream identification serves to identify a service in an ALP stream that transmits (carries) multiple services.

Meanwhile, mapping information about an upper layer stream and an SID value corresponding to the upper layer stream may be provided as link mapping Table 7 described below.

Further, when the third field is set to the fourth value, the base header may further include a field indicating least significant bits (LSBs) of a payload length, and the additional header may include a field indicating most significant bits (MSBs) of the payload length.

In addition, when the third field is set to the fourth value, the additional header may include a sixth field indicating whether an extension header is present after the additional header. Herein, the sixth field may be a header extension flag (HEF) field.

Meanwhile, when the second field is set to the second value, the base header may further include a seventh field set to a fifth value indicating that the payload of the packet transmits the segment of the input packet and the additional header is present, or a sixth value indicating that the payload of the packet transmits a plurality of input packets and the additional header is present.

Further, when the seventh field is set to the fifth value or the sixth value, the base header may further include the field indicating the LSBs of the payload length.

Further, when the seventh field is set to the fifth value, the additional header may include a field indicating an identifier of the segment transmitted in the packet (that is, an order corresponding to the segment), a field indicating whether the packet transmits a last segment of the input packet, and a field indicating whether the extension header is present after the additional header.

In addition, when the seventh field is set to the sixth value, the additional header may include a field indicating the MSBs of the payload length, a field indicating the number of input packets transmitted in the packet, and a field indicating whether the extension header is present after the additional header.

The signal processor 120 may signal-process the ALP packet generated by the packet generator 110. Herein, the signal processor 130 may perform all signal processing operations after the generation of the ALP packet. For example, the signal processor 130 may perform all signal processing operations from the generation of a baseband packet to the generation of a transmission frame.

Figure 7:
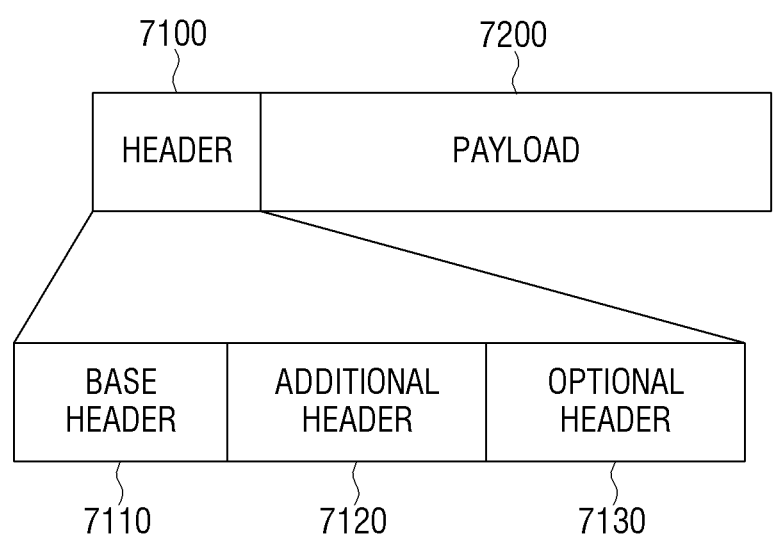
FIG. 7 is a diagram illustrating an ALP packet structure according to an exemplary embodiment.

FIG. 7 is a diagram illustrating an ALP packet structure, according to an exemplary embodiment.

Referring to FIG. 7, the ALP packet is constituted by a header 7100 and a payload 7200. The header 7100 may be divided into a base header 7110, an additional header 7120, and an optional header 7130 according to a role thereof. The ALP packet header 7100 may particularly include the base header 7110 and whether the additional head 7120 is present may vary depending on a control field value of the base header 7110 as described above. Further, whether the optional header 7130 is present may be selected by using a control field of the additional header 7120 as described above.

Figure 8:
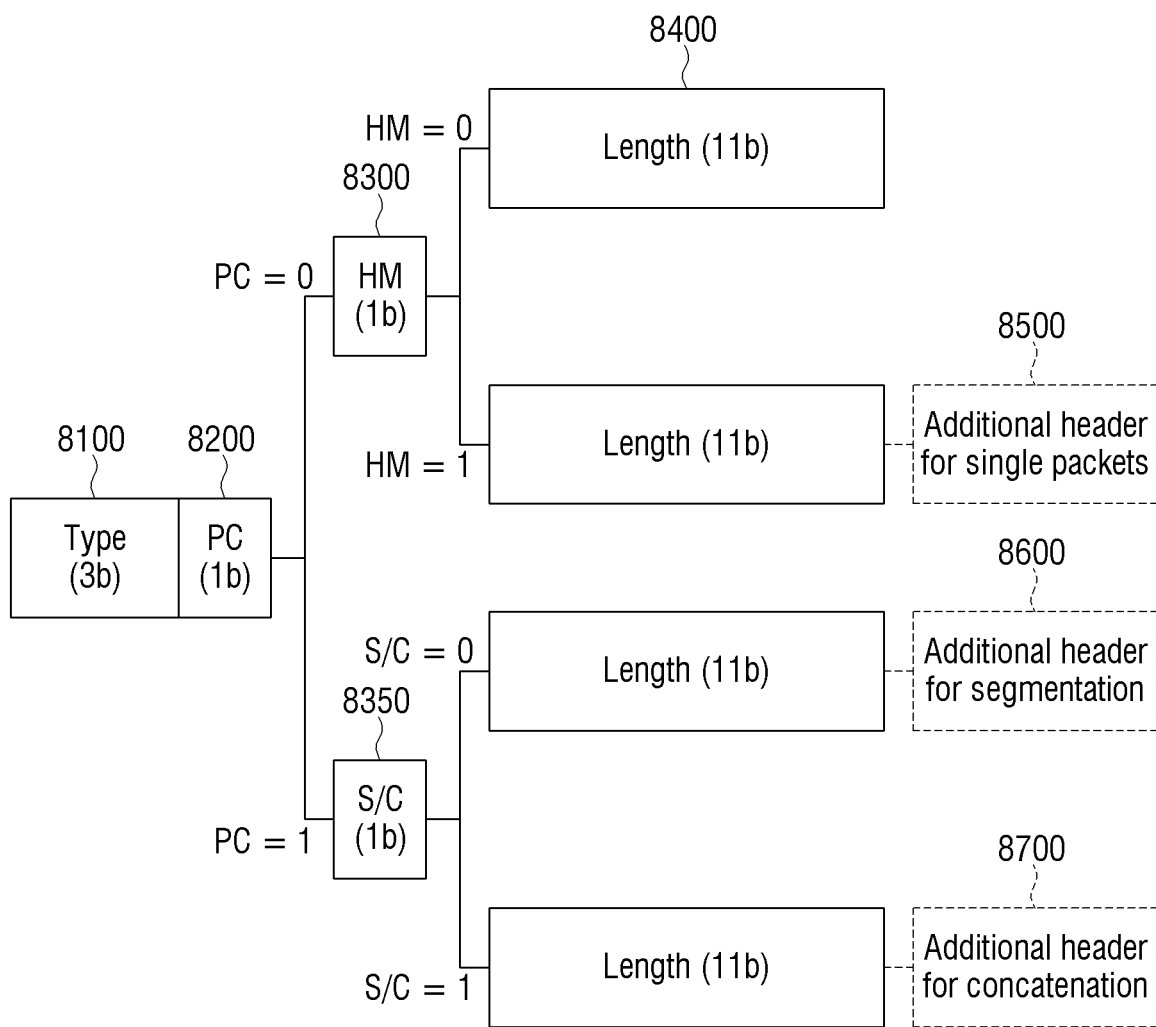
FIG. 8 is a diagram illustrating a structure of a base header of an ALP packet, according to an exemplary embodiment.

FIG. 8 is a diagram illustrating a structure of the base header 7110 of the ALP packet, according to an exemplary embodiment.

Referring to FIG. 8, the base header 7110 includes a Packet_Type field 8100. In this case, a configuration of a following field may vary according to a value of the Packet_Type field 8100, and the configuration of the field illustrated in FIG. 7 may be used when the input packet is an IPv4 packet, a compressed IP packet, a link layer signaling packet, and an extension packet.

Referring to FIG. 8, the base header 7110 further includes a payload configuration (PC) field and a following 1 bit field varies depending on a value of the PC field 8200. As one example, when the value of the PC field 8200 is '0', a header mode (HM) field 8300 follows the PC field 8200, and the HM field 8300 indicates whether the additional header 7120 is present. When the value of the PC field 8200 is '1', a Segmentation/Concatenation (S/C) field 8350 follows the PC field 8200, and the S/C field 8350 indicates whether the payload 7200 includes the plurality of input packets or a segment of an input packets. The configuration of the additional header 7120 may vary according to a value of the S/C field 8350.

Further, the base header 7110 includes a length field 8400 indicating LSB 11 bits of the length of the payload 7200.

When the base header illustrated in FIG. 8 is expressed semantically, the base header is shown in [Table 1] given below.

TABLE 1

| Syntax | No. of bits | Format |
|---|---|---|
| ALP_packet_header( ) { | | |
|     packet_type | 3 | uimsbf |
|     payload_configuration | 1 | bslbf |
|     if (payload_configuration =="0") | | |
|         header_mode | 1 | bslbf |
|         length | 11 | uimsbf |
|         if (header_mode =="1") | | |
|         additional_header_for_single_packet( ) | var | Sec. 5.1.2.1 |
|         } | | |
|     } | | |
|     else if (payload_config =="1") | | |
|         segmentation_concatenation | 1 | bslbf |
|         length | 11 | uimsbf |
|         if | | |
| (segmentation_concatenation =="0") | | |
|         additional_header_for_segmentation( ) | var | Sec. 5.1.2.2 |
|         else if | | |
| (segmentation_concatenation =="1") | | |
|         additional_header_for_concatenation( ) | var | Sec. 5.1.2.3 |
|         } | | |
|     } | | |
| } | | |

The Packet_Type field is a 3-bit field indicating a protocol or packet type applied to the input packet or input data before encapsulation into the ALP packet. As one example, the Packet_Type field may be encoded according to [Table 2] given below.

TABLE 2

| packet_type Value | Meaning |
|---|---|
| 000 | IPv4 packet |
| 001 | Reserved |
| 010 | Compressed IP packet |
| 011 | Reserved |
| 100 | Link layer signaling packet |
| 101 | Reserved |
| 110 | Packet Type Extension |
| 111 | MPEG-2 Transport Stream |

The Payload_Configuration (PC) field is a 1-bitfield indicating a configuration form of the payload 7200. When the value of the PC field 8200 is '0', the payload 7200 includes only one single complete input packet, and the HM field 8300 follows the PC field 8200. When the value of the PC field 8200 is '1', the payload 7200 may include a plurality of complete input packets or a segment of one input packet, and the Segmentation_Concatenation field 8350 follows the PC field.

The HM field is a 1-bit field indicating whether the additional header is present. When the value of the HM field 8300 is '0', the additional header 7120 is not present, and this means that the total length of the payload 7200 is smaller than 2048 bytes. When the value of the HM field 8300 is '1', the additional header is present after the length field 8400, and this indicates that the total length of the payload 7200 is larger than 2047 bytes or the optional header 7130 including the substream identifier is present.

The HM field 8300 may be present only when the value of the preceding PC field 8200 is '0'.

The Segmentation_Concatenation (S/C) is a 1-bit field indicating whether the payload 7200 includes the plurality of complete input packets or a segment of one input packet. When the value of the S/C field 8350 is '0', the payload 7200 includes only a segment of one input packet to include the additional header 7120 defined for packet division after the length field 8400. When the value of the S/C field 8350 is '1', the payload 7200 includes the plurality of complete input packets to include the additional header 7120 defined for packet combination after the length field 8400. The S/C field 8350 may be present only when the value of the PC field 8200 is '1'.

The Length field 8400 is a field indicating lower 11 bits in the length of byte unit of the payload 7200. When the additional header 7120 includes upper bits in the length of the byte unit of the payload 7200, the Length field 8400 indicates the total length of the payload 7200 through combination with the upper bits included in the additional header 7120.

Figure 9:
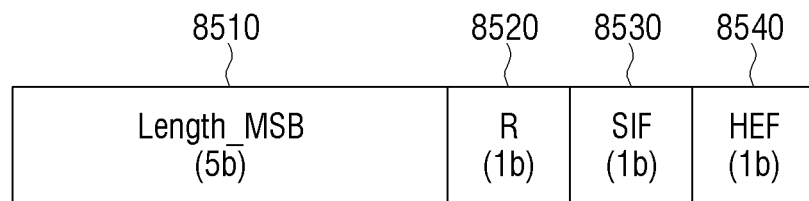
FIGS. 9 to 11 are diagrams illustrating a structure of an additional header, according to various exemplary embodiments.

FIG. 9 is a diagram illustrating the additional header 7120 when the payload 7200 includes a single complete input packet, according to an exemplary embodiment.

Referring to FIG. 9, an additional header 8500, when the payload 7200 includes one single input packet, includes a Length_MSB field 8510 indicating upper 5 bits when the byte-unit length of the payload 7200 is expressed by 16 bits, a reserved field 8520 of 1 bit, an SIF field 8530 indicating whether the substream identifier is present, and an HEF field 8540 indicating whether the extension header is present.

According to the exemplary embodiment illustrated in FIG. 8, the additional header 8500 illustrated in FIG. 9 may be present when the payload 7200 of the ALP packet includes one complete packet and the length of the payload 7200 is larger than 2047 bytes or the optional header is present. That is, the additional header 8500 may be present when the value of the PC field 8200 is '0' and the value of the HM field 8300 is '1'.

When the additional header 8500 illustrated in FIG. 9 is expressed semantically, the additional header 8500 is shown in [Table 3] given below.

TABLE 3

| Syntax | No. of bits | Format |
|---|---|---|
| additional_header_for_single_packet( ) | | |
| length_MSB | 5 | uimsbf |
| reserved | 1 | 1 |
| SIF | 1 | bslbf |
| HEF | 1 | bslbf |
| if (SIF =="1") { | | |
| sub_stream_identification( ) | 8 | bslbf |
| } | | |
| if (HEF =="1") { | | |
|    header_extension( ) | var | Sec. 5.1.3 |
| } | | |
| { | | |

The Length_MSB field is a field indicating upper 5 bits when the byte-unit length of the payload 7200 is expressed by 16 bits. The Length_MSB field indicates a total byte-unit length of the payload 7200 through combination of lower 11 bits indicated by the Length field 8400 of the base header 7110.

The SIF field is a 1-bit field indicating whether the SID field is present after the HEF field 8540. When the value of the SIF field 8530 is '0', the SID field is not present and when the value of the SIF field 8530 is '1', the SID field is present after the HEF field 8540.

The HEF field is a 1-bit field indicating whether the extension header is present after the additional header 8500. When the value of the HEF field 8540 is '0', the extension header is not present and when the value of the HEF field 8540 is '1', the extension header is present after the additional header 8500. In case the extension header is present, the extension header follows the SID field when the SID field is present, and the extension header follows the HEF field 8540 when the SID field is not present.

Figure 10:
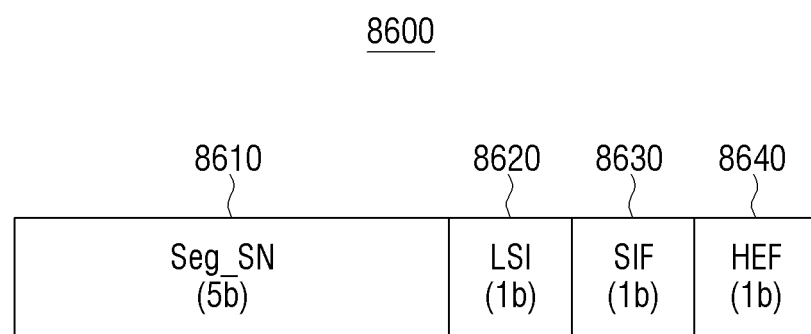

FIG. 10 is a diagram illustrating the additional header 7120 when the payload 7200 includes only a segment or part of one input packet, according to an exemplary embodiment.

Referring to FIG. 10, an additional header 8600 in case the payload 7200 includes only a segment part of one input packet includes a Seg_SN field 8610 indicating an identifier of a segmented input packet, an LIF field 8620 indicating whether the payload 7200 includes a last byte of the input packet, an SIF field 8630 indicating whether the substream identifier is present, and an HEF field 8640 indicating whether the extension header is present.

According to the exemplary embodiment illustrated in FIG. 8, the additional header 8600 illustrated in FIG. 10 may be present when the payload 7200 of the ALP packet includes a part of one input packet. That is, the additional header 8600 may be present when the value of the PC field 8200 is '1' and the value of the S/C field 8350 is '0'.

When the additional header 8600 illustrated in FIG. 10 is expressed semantically, the additional header 8600 is shown in [Table 4] given below.

TABLE 4

| syntax | No. of bits | Format |
|---|---|---|
| additional_header_for_segmentation( ) { | | |
|   segment_sequence_number | 5 | uimsbf |
|   last_segment_indicator | 1 | bslbf |
|   SIF | 1 | bslbf |
|   HEF | 1 | bslbf |
|   if (SIF =="1") { | | |
| sub_stream_identification( ) | 8 | bslbf |
| } | | |
|   if (HEF =="1") | | |
| { | | |
| header_extension( ) | var | Sec. 5.1.3 |
| } | | |
| } | | |

The Segment_Sequence_Number (Seg_SN) represents an integer of 0 or more for identifying a segment of the input packet included in the payload 7200. When a first segment of the input packet is included in the payload 7200, a value of the Seg_SN field 8610 is set to '0'. Whenever a following segment of the input packet segmented thereafter is transmitted through the ALP packet, the value of the Seg_SN field 8610 increases 1 by 1.

The Last_Segment_Indicator (LSI): is a 1-bit field indicating whether the payload 7200 includes a last segment (that is, a last byte) of the segmented input packet. In case the payload 7200 includes the last segment of the segmented input packet, the value of the LSI field 8620 is set to '1' and in the other case, the value of the LSI field 8620 is set to '0'.

The SIF field is a 1-bit field indicating whether the SID field is present after the HEF field 8640. When the value of the SIF field 8630 is '0', the SID field is not present, and when the value of the SIF field 8630 is '1', the SID field is present after the HEF field 8640.

The HEF is a 1-bit field indicating whether the extension header is present after the additional header 8600. When the value of the HEF field 8640 is '0', the extension header is not present, and when the value of the HEF field 8640 is '1', the extension header is present after the additional header 8600. In case where the extension header is present, the extension header follows the SID field when the SID field is present, and the extension header follows the HEF field 8540 when the SID field is not present.

Figure 11:
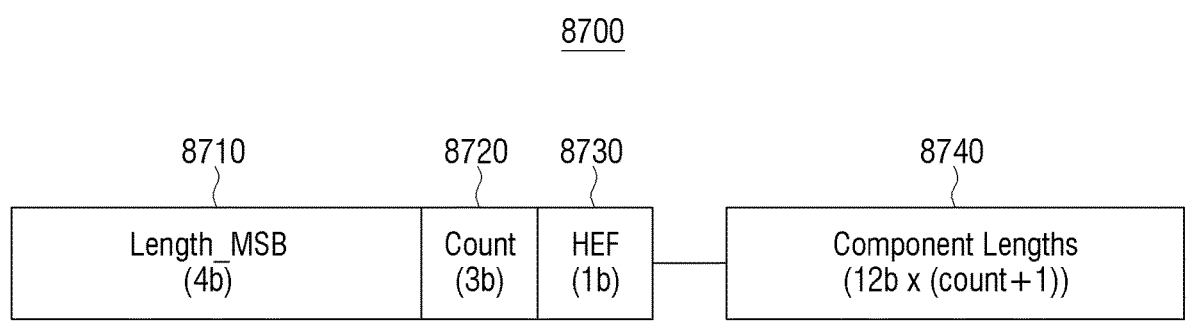

FIG. 11 is a diagram illustrating an additional header when the payload includes a plurality of complete input packets, according to an exemplary embodiment.

Referring to FIG. 11, an additional header 8700, when the payload 7200 includes a plurality of complete input packets, includes a Length_MSB field 8710 indicating upper 4 bits when the byte-unit length of the payload 7200 is expressed by 15 bits, a count field 8720 indicating the number of input packets included in the payload 7200, an HEF field 8730 indicating whether the extension header is present, and a Component Length field 8740 indicating the length of each input packet.

When the additional header 8700 illustrated in FIG. 11 is expressed semantically, the additional header 8700 is shown in [Table 5] given below.

TABLE 5

| Syntax | No. of bits | Format |
|---|---|---|
| additional_header_for_concatenation( ) { | | |
|     length_MSB | 4 | uimsbf |
|     count | 3 | uimsbf |
|     HEF | 1 | bslbf |
|     for(i=0; | | |
| i<count+1; i++) { | | |
| component_length | 12 | uimsbf |
|     } | | |
|     if (HEF =="1") | | |
| { | | |
| header_extension( ) | var | Sec. 5.1.3 |
|     } | | |
| } | | |

The Length_MSB field is a field indicating upper 4 bits when the byte-unit length of the payload 7200 is expressed by 15 bits. The Length_MSB field indicates a total byte-unit length of the payload 7200 through combination of lower 11 bits indicated by the Length field 8400 of the base header 7110.

The Count indicates a 3-bit field indicating the number of input packets included in the payload 7200. A value of the count field 8720 is set to a value acquired by subtracting 2 from the number of input packets included in the payload 7200.

The HEF is a 1-bit field indicating whether the extension header is present after the additional header 8700. When the value of the HEF field 8730 is '0', the extension header is not present and when the value of the HEF field 8730 is '1', the extension header is present after the additional header 8700. In the case where the extension header is present, the extension header follows the SID field when the SID field is present and the extension header follows the HEF field 8730 when the SID field is not present.

The Component_Length is a field indicating the length of input packets included in the payload 7200. A value of Component_Length is written in the same order as the input packet included in the payload 7200 and the length of a last input packet is omitted.

Figure 12:
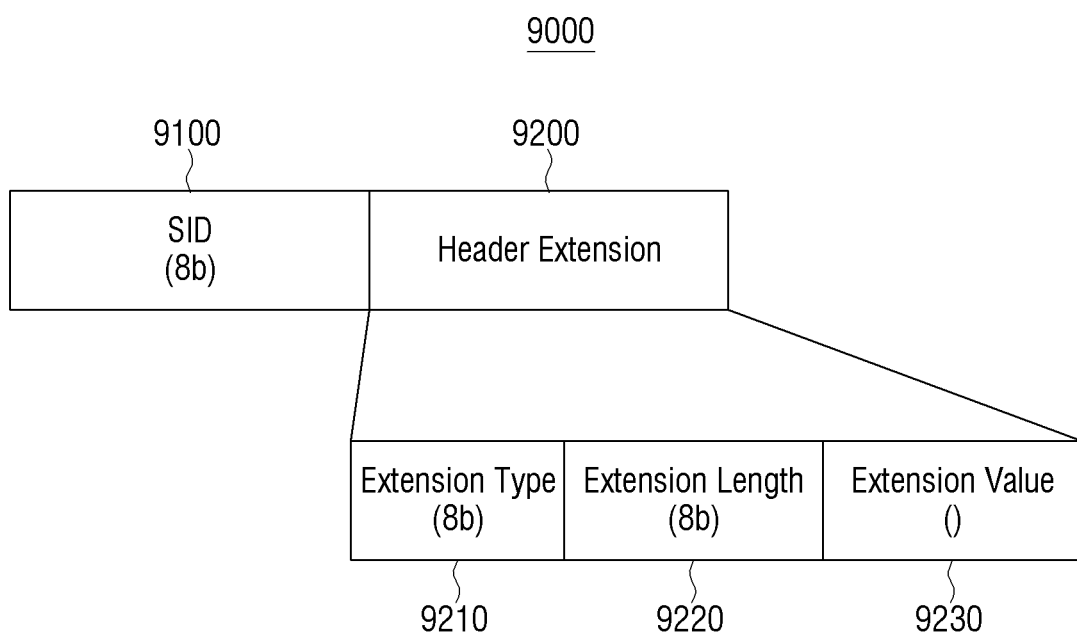
FIG. 12 is a diagram illustrating an optional header structure, according to an exemplary embodiment.

FIG. 12 is a diagram illustrating the optional header 9000 of the ALP packet, according to an exemplary embodiment.

Referring to FIG. 12, the optional header 9000 may include an SID field 9100 indicating the substream identifier and a Header Extension 9200.

The Header Extension includes an Extension Type field 9210 indicating the type of the extension header, an Extension Length field 9220 indicating the length of the extension header, and an Extension Value field 9230 including actual extension fields.

The length of the Extension Value field 9230 is given by the Extension Length field 9220, and a receiver verifies a value of the Extension Type field 9210. When the value of the Extension Type field 9210 is a value which may not be recognized by the receiver, the total length of the Header Extension 9200 is calculated by using the value of the Extension Length field 9220 and bytes corresponding to the value of the Extension Type field 9210 are removed.

The value of the SID field 9100 is set to a unique value which may be identified in one RF signal, and the broadcasting link layer 1400 may perform link layer filtering based on the value of the SID field 9100.

As one example, it is assumed that 5 services are transmitted in an RF signal having one signal processing path (PLP) and the respective services are transmitted by using 3 UDP/IP ports. The receiver processes a signal input into the PLP from the RF signal to restore link layer packets, restores packets corresponding to 15 UDP/IP sessions, and transfers the restored packets to the upper layer. Since a service selected by a user uses only 3 UDP/IP sessions, the packets that belong to 15 UDP/IP sessions are filtered by an IP layer 1300 or a UDP layer 1200 according to addresses thereof. This means that most (80%) of the packets output in the link layer are data not required in the upper layer and this reduces efficiency of a system.

In particular, when the broadcasting physical layer 1500, the broadcasting link layer 1400, and the IP layer 1300 are constituted by separate hardware or share an interface with another sharing layer, efficiency may be remarkably deteriorated due to transmission of unnecessary data. In this case, according to the exemplary embodiment, when a separate SID is allocated for each service and the SID is allocated to the link layer packet transporting a corresponding service, and as a result, the user selects the service, only a link layer packet having the SID corresponding to the selected service is processed and transferred to the IP layer 1300 to increase the system efficiency.

Herein, syntax for the SID field is shown in Table 6 given below.

TABLE 7

| Syntax | No. of bits | Format |
|---|---|---|
| sub_stream_identification( ) { | | |
|     SID | 8 | bslbf |
| } | | |

In the aforementioned exemplary embodiment, the service and the SID are mapped in a 1:1 relationship, but the SID may be arbitrarily assigned according to a grouping form of input packets to be classified in one link layer stream. The grouping form may be an IP address, a UDP port number, a session identifier (packet_id of MMTP or tsi of ROUTE) of the application layer protocol or a combination thereof.

Further, ALP packets in which the SID is allocated to one ALP packet stream and an ALP packet in which the SID is not allocated may coexist according to the implementation. In this case, the ALP packet in which the SID is not allocated is processed to be transferred to the upper layer, and it may be preferable, but not necessary, to perform filtering based on only the ALP packet in which the SID is allocated.

The link layer may be used by a method that transfers the relationship of the SID and the upper layer input packet stream to the receiver according to the exemplary embodiment.

[Table 7] shows one example of a link layer signaling table for transferring a mapping relationship of the SID and the UDP/IP session.

TABLE 7

| Syntax | No. of bits | Format |
|---|---|---|
| link_mapping_table( ) { | | |
| signaling_type | 8 | 0x01 |
| PLP_ID | 6 | Uimsbf |
| reserved | 2 | 11 |
| num_session | 8 | Uimsbf |
| for(i=0; i<num_session; i++) { | | |
| src_IP_add | 32 | Uimsbf |
| dst_IP_add | 32 | Uimsbf |
| src_UDP_port | 16 | Uimsbf |
| dst_UDP_port | 16 | Uimsbf |
| SID_flag | 1 | Bslbf |
| compressed_flag | 1 | Bslbf |
| reserved | 6 | 111111 |
| if (SID_flag=="1"){ | | |
| SID | 8 | Uimsbf |
| } | | |
| if | | |
| (compressed_flag == 1 ) { | | |
| context_id | 8 | Uimsbf |
| } | | |
| } | | |
| } | | |

Here, the signaling_type has the following values.

Table_id: identifier of a table transmitting SID_Signaling

Table_id_extension: extension identifier of the signaling table

Version: increases when a value of the table is changed

Num_session: the number of sessions in which information is described in the table Src_IP_add: source IP address Dst_IP_add: destination IP address Src_UDP_port: source UDP port Dst_UDP_port: destination UDP port SID_flag: 1-bit field indicating whether to allocate the SID, the SID is allocated to the ALP packet including the UDP/IP packet transmitted to the corresponding session only when the value of SID_flag is 1.

SID: substream identifier, unique in one RF signal (physical layer frame).

[Table 8] shows an SID signaling table, according to an exemplary embodiment.

TABLE 8

| Syntax | No. of bits | Format |
|---|---|---|
| link_mapping_table( ) { | | |
| signaling_type | 8 | 0x01 |
| PLP_ID | 6 | uimsbf |
| reserved | 2 | 11 |
| num_session | 8 | uimsbf |
| for(i=0; i<num_session; i++) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '111111' |
| if (SID_flag=="1") { | | |
| SID | 8 | uimsbf |
| } | | |
| if | | |
| (compressed_flag == 1 ) { | | |
| context_id | 8 | uimsbf |
| } | | |
| } | | |
| } | | |

In above [Table 8], the Num_service indicates the number of services in which information is described in the table, and the Service_id indicates a service identifier.

In the signaling tables shown in [Table 7] and [Table 8], only the SIP is allocated to each of the UIDP/IP sessions or the SID is allocated by the unit of the service.

According to the exemplary embodiment, when the IP header is compressed, signaling information required for compressing the IP header may be included in [Table 7] or [Table 8].

As one example, an identifier indicating a header compression method used when one or more IP header compression methods are used, and information required to restore a compression header in the receiver may be included. One example of the information required to restore the compression header includes Context ID of ROHC.

The SLT 1150 illustrated in FIG. 1 may be used by a method that transfers the relationship between the SID and the service according to the exemplary embodiment to the receiver.

[Table 9] shows a descriptor indicating a mapping relationship between the SID and the service, and may be transmitted to a service level descriptor in a service loop of the SLT at that time.

TABLE 9

| Syntax | No. of Bits | Format |
|---|---|---|
| link_layer_filtering_descriptor( ) { | | |
| descriptor_tag | 8 | uimsbf |
| descriptor_length | 8 | uimsbf |
| SID | 8 | uimsbf |
| } | | |

In above [Table 9], the SID indicates a substream identifier corresponding to a service at which the descriptor is positioned The transmitter according to the exemplary embodiment may display the same value as the SID in the link layer packet transmitting service to which the SID is allocated in an SID field 8100 of the optional header.

Figure 13:
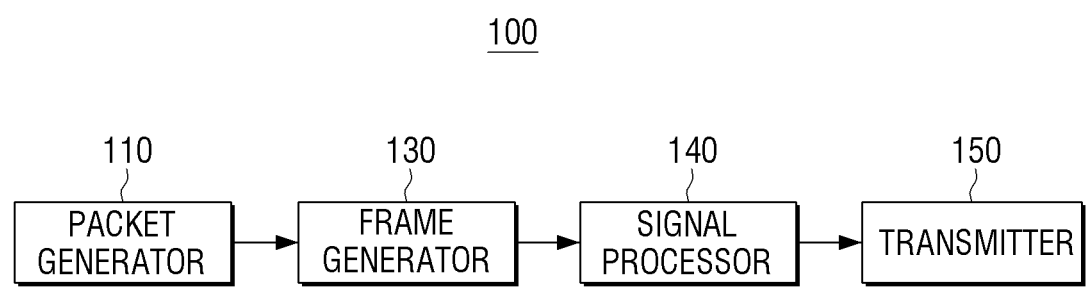
FIG. 13 is a block diagram illustrating a configuration of a transmitting apparatus, according to another exemplary embodiment.

FIG. 13 is a block diagram illustrating a configuration of a transmitting apparatus according to another exemplary embodiment. Referring to FIG. 13, the transmitting apparatus 100 includes a packet generator 110, a frame generator 130, a signal processor 140, and a transmitter 150. Among components illustrated in FIG. 13, since a configuration of the packet generator 110 is the same as the configuration of the packet generator 110 illustrated in FIG. 6, a detailed description will be omitted.

The packet generator 110 generates a packet, for example, an ALP packet as described above.

The frame generator 130 may generate a frame including the ALP packet generated by the packet generator 110. Herein, the generated frame may be a baseband packet (BBP) (that is, an L1 packet) including the ALP packet. However, the terms indicating the packet may vary according to a system. For example, the ALP packet and the BBP packet may be referred to as the BBP packet and a baseband frame (BBF), respectively according to a system.

In detail, the frame generator 130 arranges a plurality of ALP packets including an IP packet and a header to generate the arranged ALP packets as a baseband packet having a size corresponding to an FEC code. The ALP packet according to the exemplary embodiment may be a TS packet, but the same process may be applied to various types of data as well as the TS packet. A process of generating the ALP packet and the baseband packet will be described in detail through FIGS. 23A and 23B.

Figure 14:
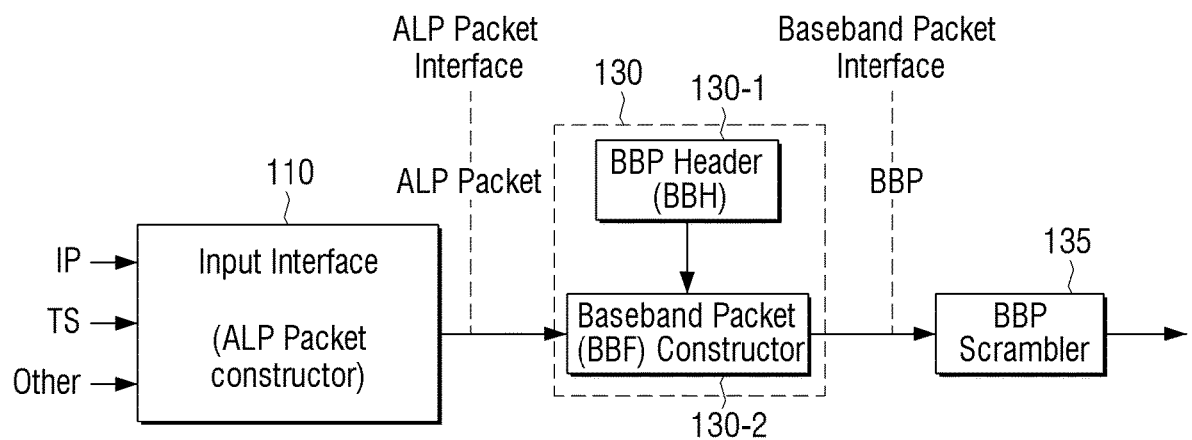
FIG. 14 is a block diagram illustrating a detailed configuration of a frame generator, according to an exemplary embodiment.

FIG. 14 is a block diagram illustrating a detailed configuration of a frame generator, according to an exemplary embodiment.

Referring to FIG. 14, the frame generator 130 may include a baseband header generator 130-1 and a baseband packet generator 130-2. In addition, the baseband packet generator 130-2 may transmit a generated baseband packet to a baseband packet scrambler 135.

The baseband header generator 130-1 may generate a header inserted in the baseband packet. Herein, the header inserted in the baseband packet is referred to as a baseband header, and the baseband header includes information on the baseband packet.

The baseband header generator 130-1 may generate the baseband header including information on the number of TS packets in an ALP packet, the number of removed null packets, and the like when an input stream is a TS. Besides, the baseband header generated by the baseband header generator 130-1 may include various information as described below.

Further, the baseband packet generator 130-2 encapsulates the baseband header generated from the baseband header generator 130-1 in the ALP packet output from the packet generator 110 to generate the baseband packet.

In addition, the baseband packet scrambler 135 mixes data stored in the baseband packet in a random order before FEC coding is applied to the respective baseband packets to generate the scrambled baseband packet. The scrambled baseband packet is transmitted through a PLP and signal-processed. In this case, one PLP may be constituted by baseband packets having a fixed size. That is, the input stream may be encapsulated to the baseband packet for one PLP.

Meanwhile, the PLP means a signal path which is independently processed. That is, respective services (for example, video, extension video, audio, a data stream, and the like) may be transmitted and received through multiple RF channels, and the PLP is a path through which the services are transmitted or a stream transmitted through the path. Further, the PLP may be positioned at slots distributed on multiple RF channels with a time interval or distributed on one RF channel with a time interval. That is, one PLP may be transmitted while being distributed on one RF channel or multiple RF channels with a time interval.

A PLP structure is constituted by Input mode A providing one PLP and Input mode B providing multiple PLPs. When the PLP structure supports Input mode B, the PLP structure may provide a strong specific service and a time interleaving length is increased by distributing and transmitting one stream to acquire a time diversity gain. Further, when only a specific stream is received, a power supply of the receiver is turned off for a residual time to be used with low power, and as a result, the receiver is suitable for providing a portable and mobile broadcasting service.

Herein, the time diversity is technology that when a transmitting side transmits the same signal with a predetermined time interval several times in order to reduce deterioration of a transmission quality in a mobile communication transmission path, a receiving side synthesizes the received signals again to acquire excellent transmission quality.

Further, information which may be commonly transmitted to a plurality of PLPs is transmitted while being included in one PLP to increase transmission efficiency and PLP0 performs such a role and when the PLP is referred to as a common PLP and residual PLPs other than PLP0 may be used for data transmission and the PLP is referred to as a data PLP. When such a PLP is used, a home HDTV program may be received and an SDTV program may be provided even while carrying and moving. Further, various broadcasting services may be provided to a viewer through a broadcasting station or a broadcasting content provider and differentiated services in which a broadcast may be received may be provided even in a fringe area where viewing is difficult.

Figure 15:
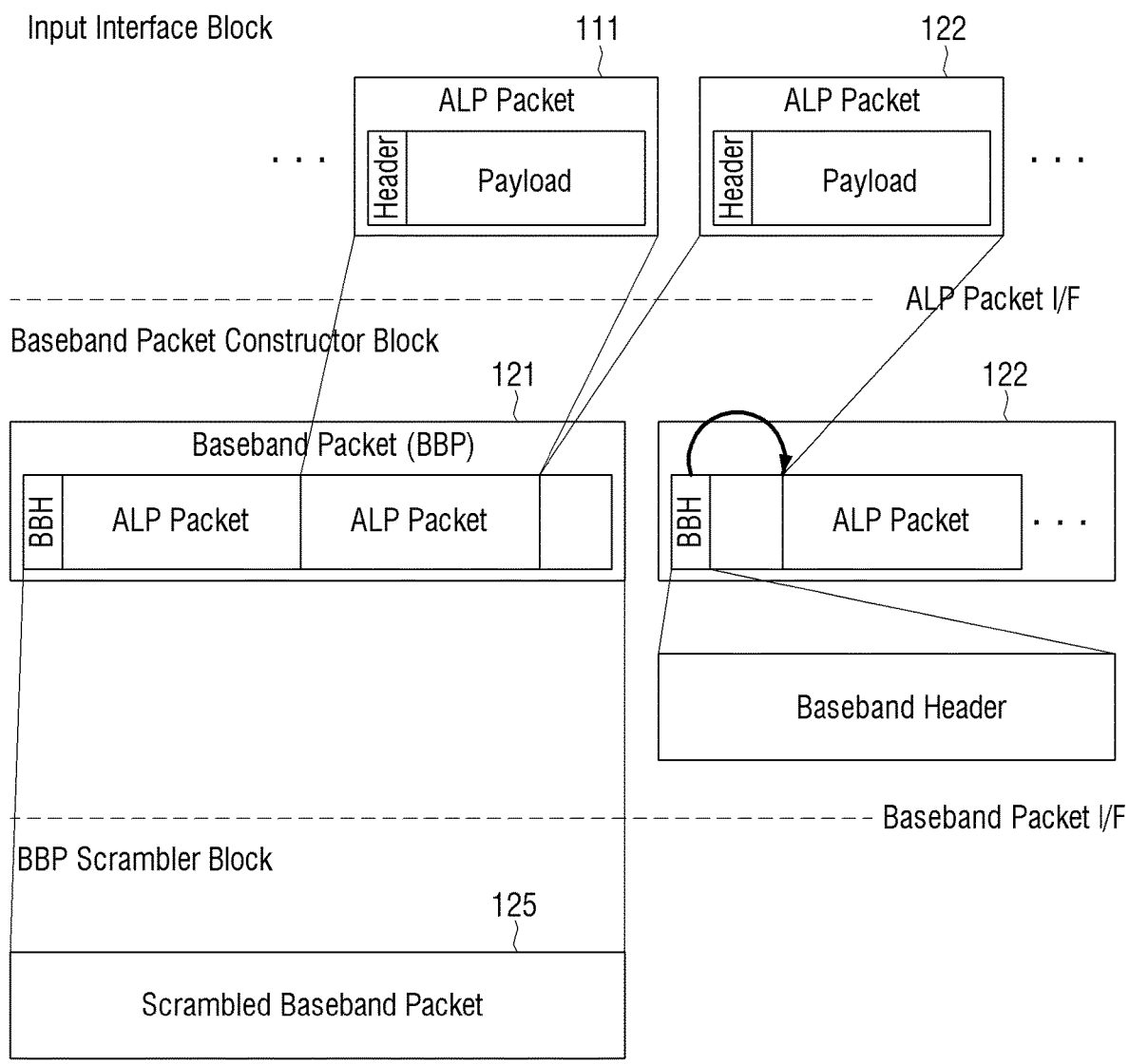
FIG. 15 is a diagram illustrating an ALP packet, a baseband packet, and a scrambled baseband packet, according to an exemplary embodiment.

Meanwhile, FIG. 15 is a diagram illustrating an ALP packet, a baseband packet, and a scrambled baseband packet, according to an exemplary embodiment.

Referring to FIG. 15, when the packet generator 110 stores the IP packet in a payload and inserts the header to generate a plurality of ALP packets 111 and 112, the frame generator 130 groups the plurality of generated ALP packets 111 and 112, and inserts the baseband header to generate a plurality of baseband packets 121 and 122. Herein, the respective baseband packets 121 and 122 may include a plurality of ALP packets and further, may include some of the ALP packets.

The baseband packet scrambler 135 randomly scrambles the respective generated baseband packets 121 and 122 to generate a plurality of scrambled baseband packets 125-1 and 125-2. In addition, the generated scrambled baseband packets 125-1 and 125-2 may be transmitted to the PLP as described above, and subjected to signal processing for adding FEC codes.

Referring back to FIG. 13, the signal processor 140 may signal-process the generated baseband packet.

In detail, the signal processor 140 signal-processes the baseband packet to generate a transmission frame.

Further, the signal processor 140 may insert signaling information into a signaling area of the frame. Herein, the signaling information may be a layer 1 (L1) signaling signal transmitting an L1 signal for frame synchronization, and a preamble into which the L1 signaling information is inserted may include an L1 pre signaling area and an L1 post signaling area.

Meanwhile, although not illustrated, the signal processor 140 may perform functions corresponding to bit interleaved and coded modulation (BICM) blocks 12000 and 12000-1 and framing/interleaving blocks 13000 and 13000-1 illustrated in FIGS. 3A to 3C.

The transmitter 150 may transmit the signal-processed frame to a receiver (not illustrated).

In detail, the transmitter 150 may perform functions corresponding to the waveform generation blocks 14000 and 14000-1 illustrated in FIGS. 3A to 3C. That is, the transmitter 140 performs modulation for modulating the generated frame to the RF signal, and transmits the RF signal to the receiver.

Hereinafter, a structure of a header of an ALP packet according to various exemplary embodiments will be described in detail with reference to the accompanying drawings. However, detailed description of parts which are duplicated with the aforementioned components among components illustrated in drawings described below will be omitted.

Figure 16A:
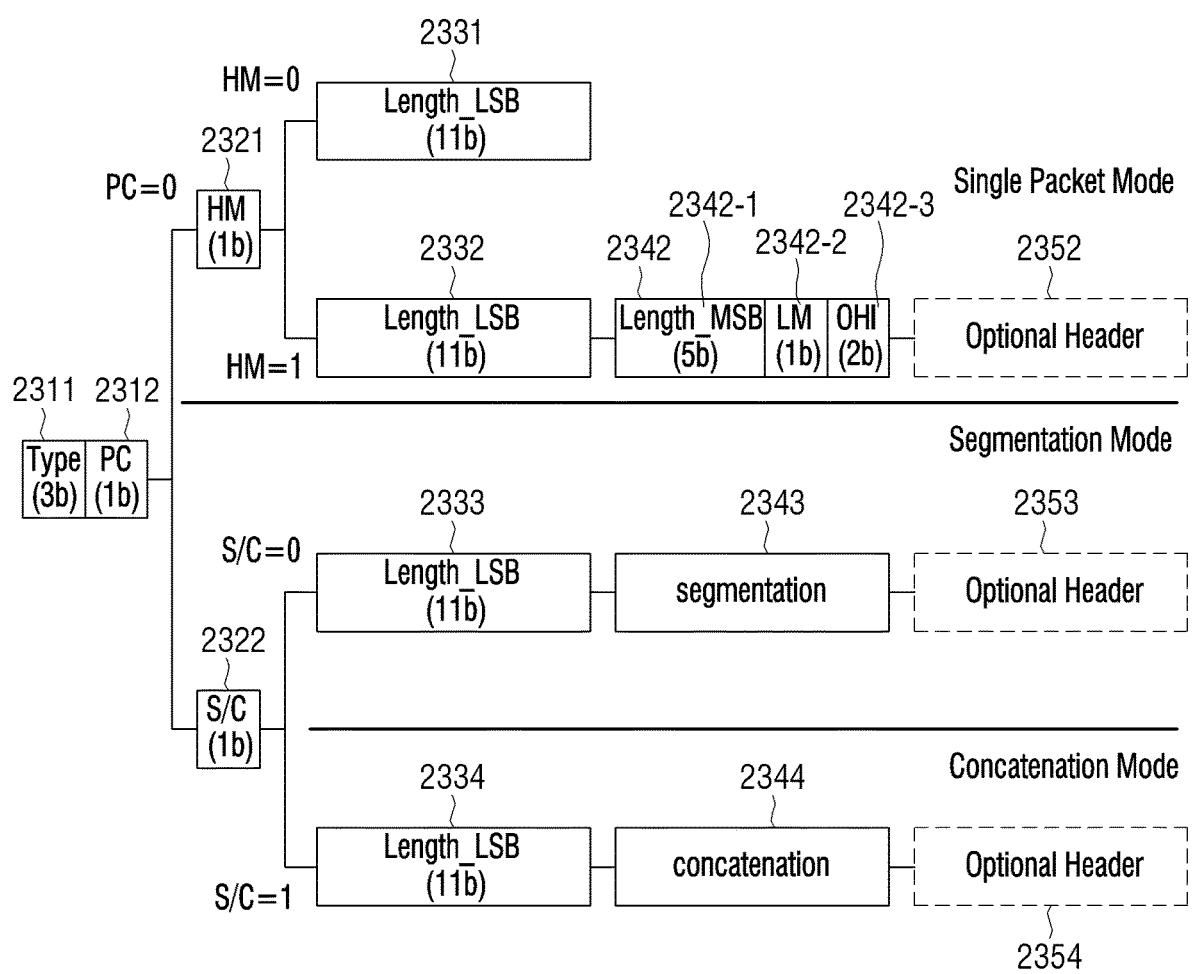
Figure 16B:
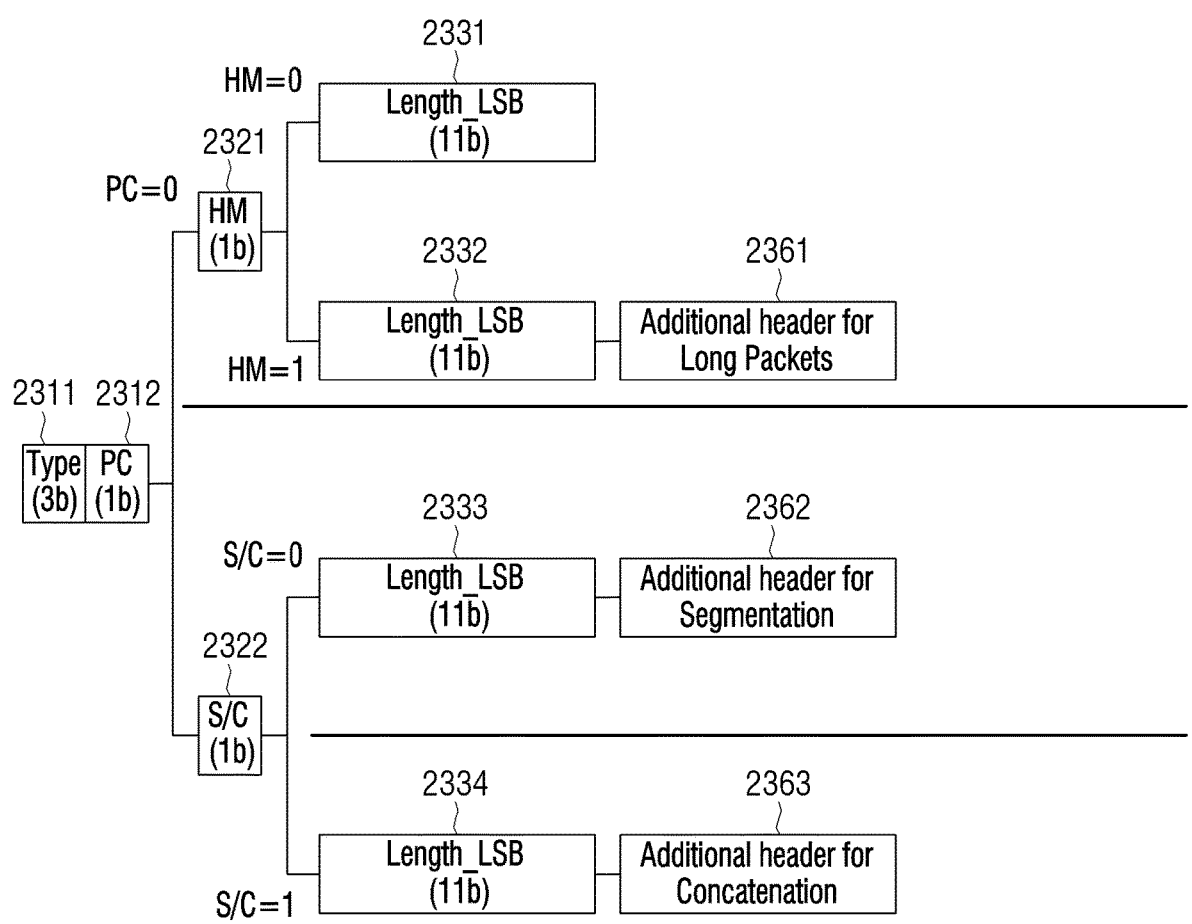

FIGS. 16A and 16B are diagrams illustrating a structure of a header of an ALP packet according to various exemplary embodiments.

A TYPE field and a PC field illustrated in FIG. 16A are implemented as a common part.

A TYPE field 2311 indicates the type of a packet (L3 packet) of input data. For example, the TYPE field 2311 may be implemented as a 3-bit field. A bit value 000 may represent IPv4, a bit value 001 may represent a compressed IP packet, a bit value 010 may represent an MPEG-2 transmission stream, a bit value 011 may represent reserved, a bit value 100 may represent L2 signaling, bit values 101 to 110 may represent reserved, and a bit value 111 may represent future extension.

A PC field 2312 indicates whether a current ALP packet transmits one single complete L3 packet (for example, IP packet). For example, the PC field 2312 may be implemented as a 1-bit field and in this case, the value of "1" may represent that the payload of the current ALP packet transmits one single complete L3 packet, while the value of "1" may represent that the payload of the current ALP packet transmits a plurality of complete L3 packets or a segment of the L3 packet.

An S/C field 2322 indicates whether the payload of the current ALP packet transmits the segment of the L3 packet or the plurality of complete L3 packets. For example, an S/C field 2322 may be implemented as the 1-bit field and in this case, the value of "0" may represent that the payload of the current ALP packet transmits a segment of the L3 packet, while the value of "1" may represent that the payload of the current ALP packet transmit a plurality of complete L3 packets.

[Single Packet Mode]

An HM field 2321 indicates at least one of a plurality of features, for example, whether an input packet is a long input packet and whether an additional header is present. For example, the HM field 2321 may be implemented as a 1-bit field. In this case, the value of "0" represents that the features are not used and represents that the length of a current ALP packet is 2 bytes. On the contrary, the value of "1" represents that at least one of the features is used. For example, the value of "0" represents that the additional header is not present and the length of the payload of the ALP packet is less than 2048, and the value of "1" represents that an additional header for a single packet is present. In this case, an additional header 2342 disposed after a Length_LSB 2332 continuously starts together with, for example, a Long SDU or a 1 byte signaling the use of an optional header feature.

The Length_LSB fields 2331 and 2332 represent LSBs of the payload length (bytes) in the current ALP packet. For example, the Length_LSB fields 2331 and 2332 may be implemented as an 11-bit field. In this case, when the HM field 2321 is set to 0, the Length_LSB fields 2331 and 2332 represent an actual length (bytes) of the payload in the current ALP packet, and when the HM field 2321 is set to 1, the Length_LSB field 2332 is connected with a Length_MSB field 2342-1 in the additional header 2342 to provide the actual total length (bytes) of the payload in the current ALP packet.

Meanwhile, the Length_MSB field 2342-1, an LM field 2342-2, an OHI field 2342-3, and an optional header 2352 are shown only when the value of the HM field 2321 is "1".

The Length_MSB field 2342-1 provides MSBs of the payload length (bytes) in the current ALP packet. The Length_MSB field 2341 is implemented as a 5-bit field and connected with the LSB field 2332 having the length of 11 bits to form a 16-bit-length field indicating the total length of the payload data. As a result, the maximum length of the payload data becomes 65,535 ($2^{16}$-1) bytes.

The LM field 2342-2 indicates whether the length of the payload in the current ALP packet is long or short. The LM field 2342-2 may be implemented as, for example, a 1-bit field. In this case, the value of "0" represents a short L2 payload length shorter than $2^{11}$=2048, while the value of "1" represents a long L2 payload length which is 2048 bytes or more and 65,535 bytes or less.

The OHI field 2342-3 indicates whether a feature of a predetermined optional header, for example, labeling indicating a header compression mode or header extension is used. For example, the OHI field 2342-3 may be implemented as a 2-bit field.

The length and the value of the Optional Header field 2352 may vary depending on the value of the OHI field. The Optional Header will be separately described afterwards.

[Segmentation Mode]

In order to implement the segmentation mode, the segmentation mode may be segmented into a case in which only an Seg SN field indicating an identifier of a segment of the L3 packet transmitted in the current ALP packet is used and a case in which a Seg ID representing an identifier of the segmented L3 packet is together used in addition to the Seg SN field. Each case may also be divided into a short ALP packet mode and a long & short ALP packet mode.

Meanwhile, as the length of the L3 packet (an input of an L2 protocol), up to $2^{11}$-1=2047 bytes may be considered as a general case, and, as the maximum length, up to $2^{16}$-1=65,535 bytes may be considered. Further, as the length of the ALP packet (an output of the L2 protocol), up to $2^1$-1=2,047 bytes may be considered in a short packet mode, and up to $2^{16}$-1=65,535 bytes may be considered in a long packet mode.

FIG. 16B illustrates a modified exemplary embodiment of FIG. 16A and an additional header 2361 for a long packet, an additional header 2362 for segmentation (i.e., for a segment of the L3 packet), and an additional header 2363 for concatenation (i.e., for a plurality of L3 packets) may be disposed after some Length_LSB fields 2332, 2333, and 2334. In detail, the S/C field 2322 indicates that the payload of the current ALP packet transmits a segment of the L3 packet and includes the additional header 2362, or indicates that the payload of the current ALP packet transmits a plurality of complete L3 packets and includes the additional header 2363. For example, the S/C field 2322 may be implemented as a 1-bit field, and, in this case, the value of "0" may represent that the payload of the current ALP packet transmits a segment of the L3 packet and the payload of the current ALP packet includes the additional header, while the value of "1" may represent that the payload of the current ALP packet includes a plurality of L3 packets and includes the additional header 2363.

Figure 17:
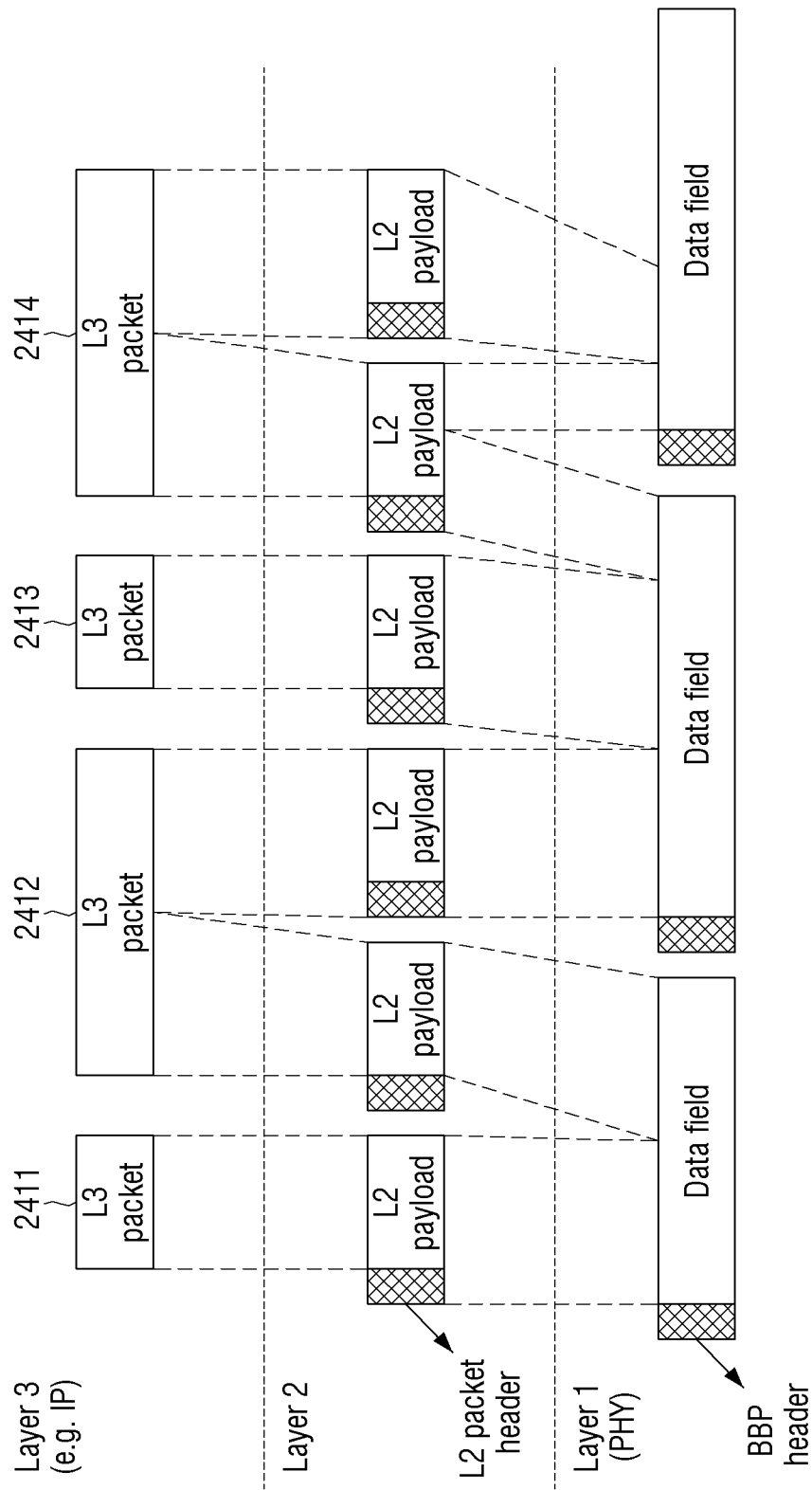

FIG. 17 is a diagram illustrating a relationship between a segmented L3 packet and an ALP packet, according to an exemplary embodiment.

Changing a transmission order of L3 packets and segments thereof is not permitted. As a result, all ALP packets including the segments of the L3 packets are consecutively transmitted as illustrated in FIG. 17. Another predetermined L3 packet may be encapsulated into an ALP packet only after a last segment of the previous L3 packet is transmitted.

Further, the identifier Seg ID representing an identifier of a segmented L3 packet may be allocated to each segmented L3 packet. All of the ALP packets including the segment of the same L3 packet have the same Seg ID value. The value of Seg ID is used to check integrity of a reassembled L3 packet at a receiving end.

Figure 18A:
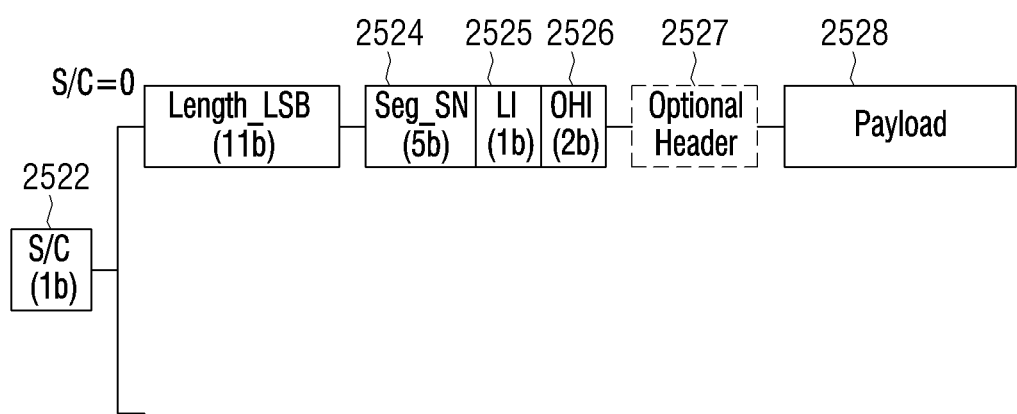
Figure 18B:
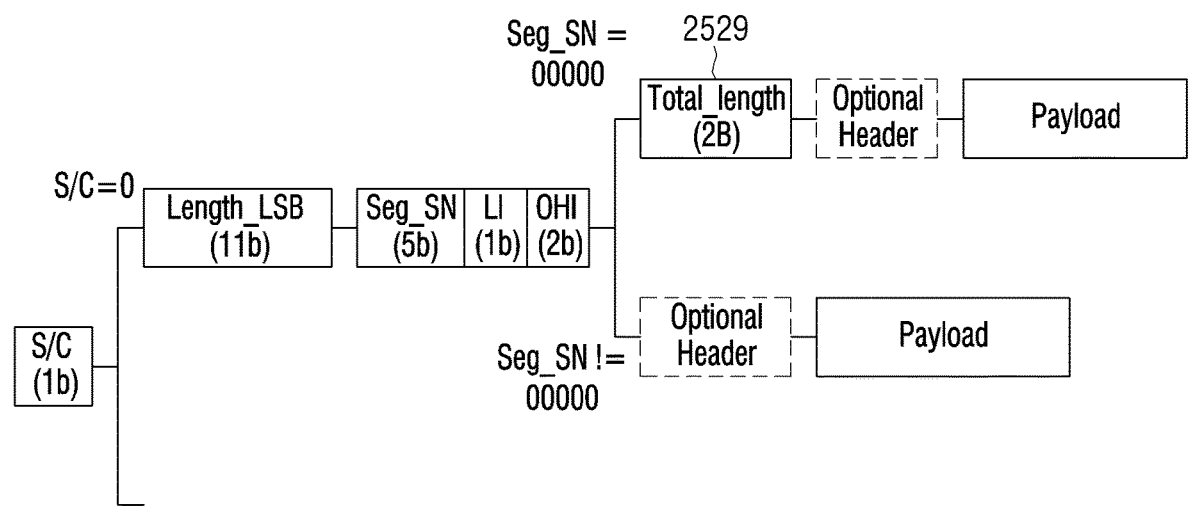
Figure 18C:
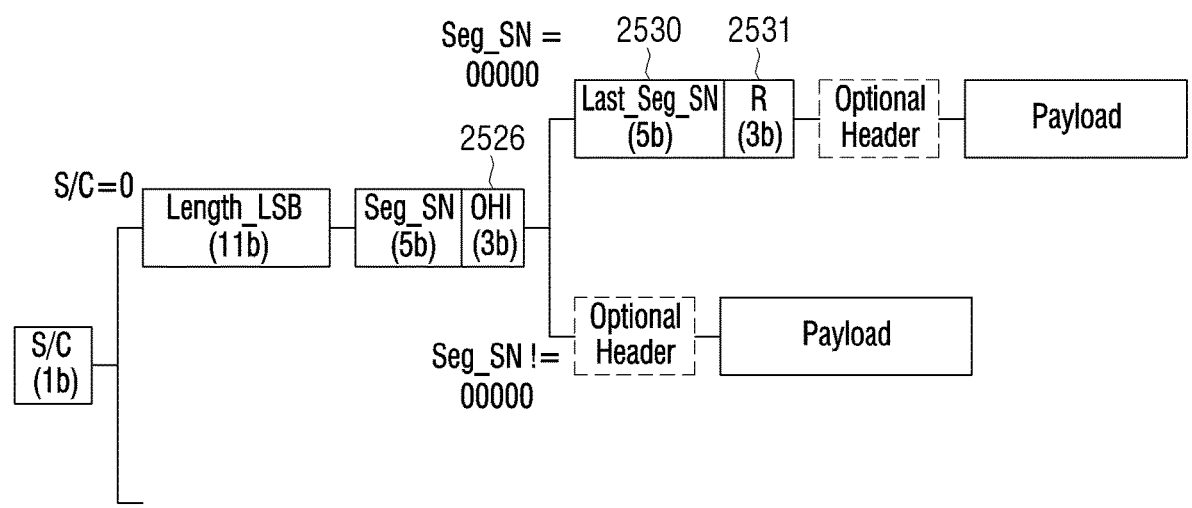

FIGS. 18A to 18C are diagrams illustrating a structure of a header of an ALP packet in a segmentation mode, according to exemplary embodiments.

FIGS. 18A to 18C illustrate various exemplary embodiments of a case in which only the Seg SN among options for implementing the segmentation mode is used and the maximum length of the payload is 2407 bytes.

FIG. 18A illustrates a structure of a header of an ALP packet, according to an exemplary embodiment.

An S/C field 2522 indicates whether a payload of a current ALP packet transmits a segment of an L3 packet or a plurality of complete L3 packets. For example, the S/C field 2522 may be implemented as a 1-bit field and, in this case, the value of "0" may represent that the payload of the current ALP packet transmits a segment of the L3 packet which is an SDU, while the value of "1" may represent that the payload of the current ALP packet transmit a plurality of complete L3 packets.

A Length_LSB fields 2523 and 2332 represent the length (bytes) of the payload in the current ALP packet. For example, the Length_LSB field 2523 may be implemented as an 11-bit field.

A Seg_SN field 2524 provides an identifier (a corresponding order of the segments) of a segment of the L3 packet transmitted in the current ALP packet. For example, the Seg_SN field 2524 may be implemented as a 5-bit field, and, in this case, identifiers for up to 32 segments may be provided.

A last indicator (LI) field 2525 indicates whether the current ALP packet transmits the last segment of the L3 packet. For example, the LI field 2525 may be implemented as a 1-bit field. In this case, the value of "1" represents that the current ALP packet transmits the last segment of the L3 packet, and the value of "0" represents that the last segment of the current L3 packet is not present in the current ALP packet.

An OHI field 2526 indicates whether a feature of a predetermined optional header, for example, labeling indicating a header compression mode or header extension is used. For example, the OHI field 2526 may be implemented as a 2-bit field.

The length and the value of an Optional Header field vary depending on the value of the OHI field. In one implementation example, a corresponding field may be present only when Seg_SN=0000.

In some cases, the LI field 2525 may be omitted and the OHI field 2526 of 3 bits may be used.

FIG. 18B illustrates a structure of a header of an ALP packet, according to another exemplary embodiment.

A Total_length field 2529 provides the total length (bytes) of an L3 packet segmented through a plurality of ALP packets. For example, the Total_length field 2529 may be implemented as a 16-bit field. A corresponding field is used for checking a length after recombining segments from different ALP packets at a receiving end. In one implementation example, the corresponding field may be present only when Seg_SN=0000. Since the use of other fields is the same as the use described in FIG. 18A, a detailed description will be omitted. In some cases, the LI field may be omitted and the OHI field of 3 bits may be used.

FIG. 18C illustrates a structure of a header of an ALP packet, according to yet another exemplary embodiment.

A Last_Seg_SN field 2530 indicates the number of ALP packets transmitting all segments of an L3 packet. For example, the Last_Seg_SN field 2530 may be implemented as a 5-bit field, and a value of the corresponding field is the same as the value of the Seg SN field in the ALP packet transmitting the last segment of the L3 packet.

An R field 2531 may be reserved for future use, and implemented as, for example, a 3-bit field.

Meanwhile, in a corresponding implementation example, the LI field may be omitted and the OHI field 2526 of 3 bits may be used.

Figure 19A:
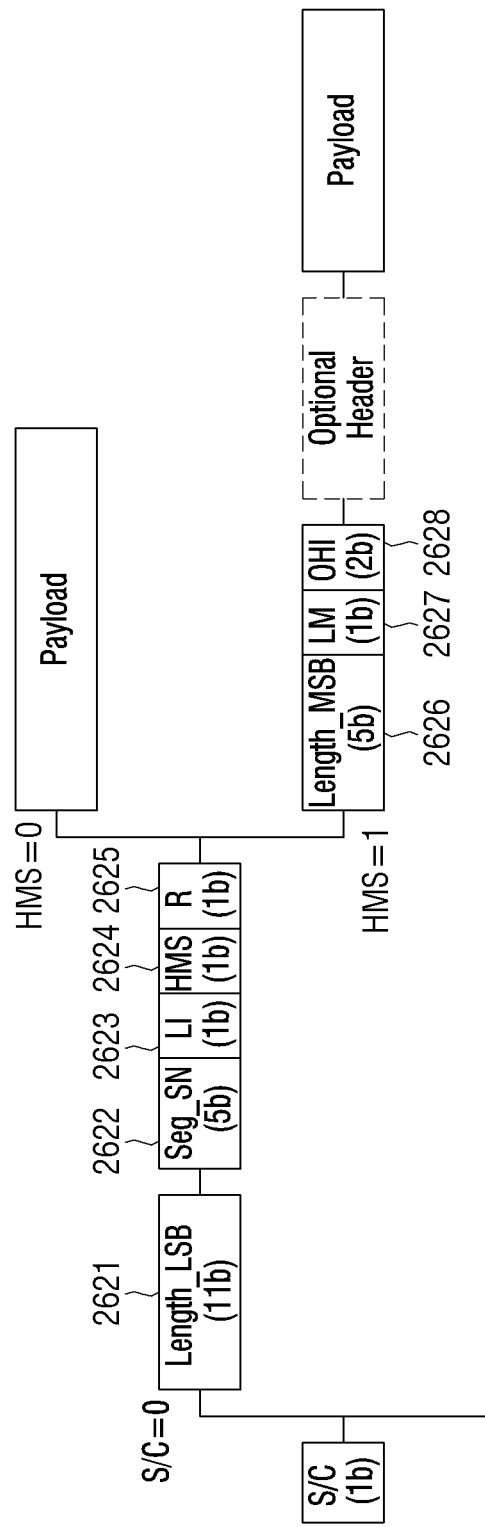
Figure 19B:
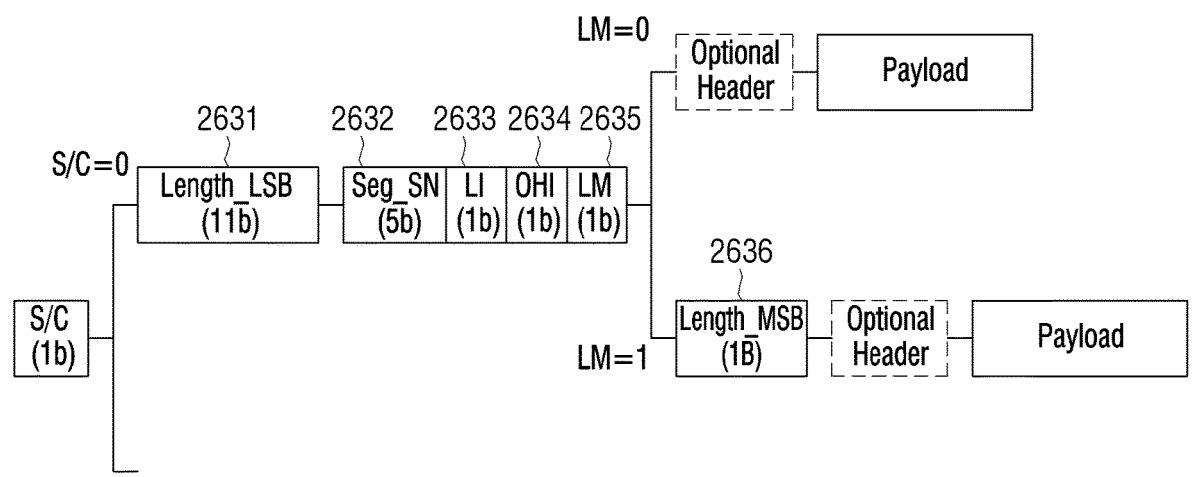

FIGS. 19A and 19B illustrate various exemplary embodiments of a case in which only the Seg SN among options for implementing the segmentation mode is used and the maximum length of the payload is 65,535 bytes.

FIG. 19A illustrates a structure of a header of an ALP packet, according to an exemplary embodiment.

A Length_LSB field 2621 indicates the payload length (bytes) of 11 LSBs in a current ALP packet. For example, the Length_LSB field 2621 may be implemented as an 11-bit field. In this case, when a header mode for segmentation (HMS) field 2624 is 0, the Length_LSB field 2621 indicates the actual length (bytes) of a payload in the current ALP packet. Otherwise, the Length_LSB field 2621 is connected with a field Length_MSB in an additional header in order to provide the actual total length (bytes) of the payload in the current ALP packet.

The use of an Seg_SN field 2622 and an LI field 2623 is the same as the exemplary embodiment illustrated in FIGS. 18A and 18B.

The HMS field 2624 indicates a predetermined feature, for example, whether to use the additional header, that is, whether the current ALP packet is a long ALP packet. For example, the HMS field 2624 may be implemented as a 1-bit field. In this case, the value of "0" is not used for all of the features and represents that the length of the current ALP packet is 2 bytes. Otherwise, the value of "1" represents that at least one of the features is used and in this case, the additional header after a reserved R field 2625 continuously starts together with, for example, the long SDU or a 1 byte signaling the use of the feature of an optional header.

The reserved R field 2625 may be reserved for future use and implemented as, for example, a 1-bit field.

Values of a Length_MSB field 2626, an LM field 2627, and an OHI field are shown only when a value of the HMS field 2624 is "1", and the use of these fields is the same as an exemplary embodiment regarding a base structure illustrated in FIG. 16A.

FIG. 19B illustrates a structure of a header of an ALP packet, according to another exemplary embodiment.

A Length_LSB field 2631 indicates LSBs of the payload length (bytes) in a current ALP packet. For example, the Length_LSB field 2631 may be implemented as an 11-bit field. In this case, when an LM field 2635 is 0, the Length_LSB field 2631 indicates the actual length (bytes) of the payload in the current ALP packet. Otherwise, when the LM field 2635 is 1, the Length_LSB field 2631 is connected with a Length_MSB field 2636 in an additional header in order to provide the actual total length (bytes) of the payload in the current ALP packet.

The use of an Seg_SN field 2632 and an LI field 2633 is the same as the exemplary embodiment illustrated in FIG. 19A.

The LM field 2635 indicates whether the length of the payload in the current ALP packet is long or short. For example, the LM field 2635 may be implemented as a 1-bit field. In this case, the value of "0" represents a short L2 payload length shorter than $2^{11}=2048$ bytes, while the value of "1" represents a long L2 payload length which is 2048 bytes or more and 65,535 bytes or less.

A Length_MSB field 2636 provides the payload length (bytes) of 8 MSBs in the current ALP packet. For example, the Length_MSB field 2636 may be implemented as a 8-bit field. LENGMSB of 3 MSB is reserved for future use and is set to "000" in an exemplary embodiment. Residual 5 bits of LENGMSB is connected with an LENGLSB field of 11 bits in order to form a 16-bit LENG field providing the total length of the payload data. As a result, the maximum length of the payload data is equal to 65535 ($=2^{16}-1$) bytes. The corresponding field is shown only when the value of the LM field 2635 is "1".

Meanwhile, in the exemplary embodiments illustrated in FIGS. 19A and 19B, the Total_length field or the Last Seg SN field may be shown when the value of the Seg_SN field is 0. The OHI field and the Optional Header will be described in detail afterwards.

Figure 20A:
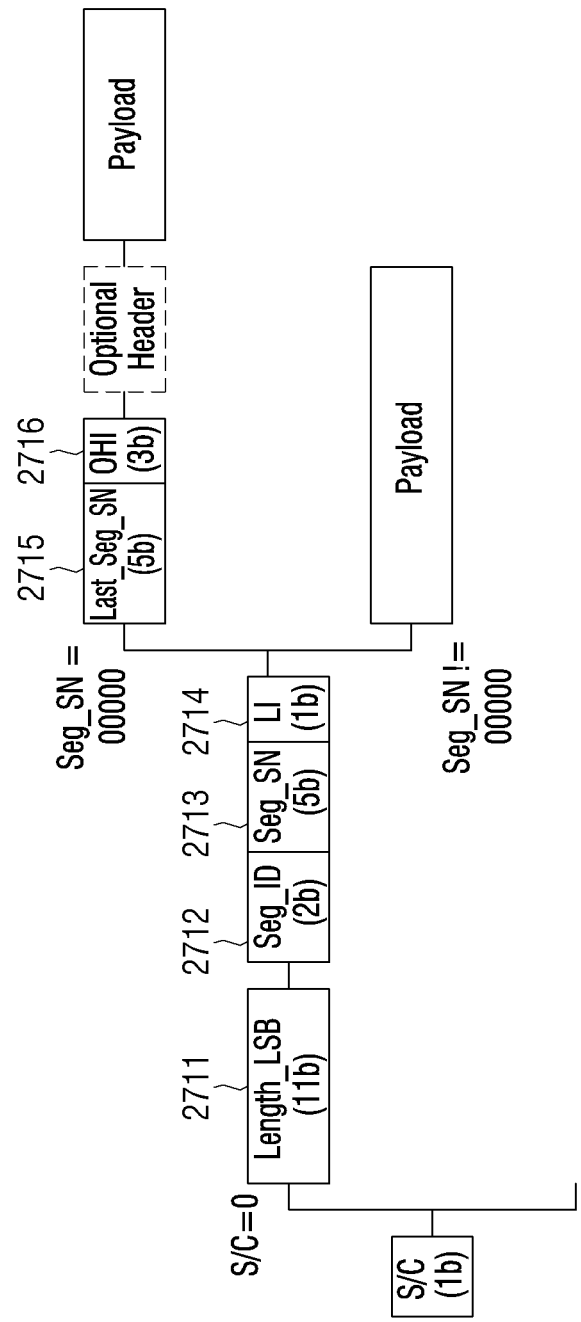
Figure 20B:
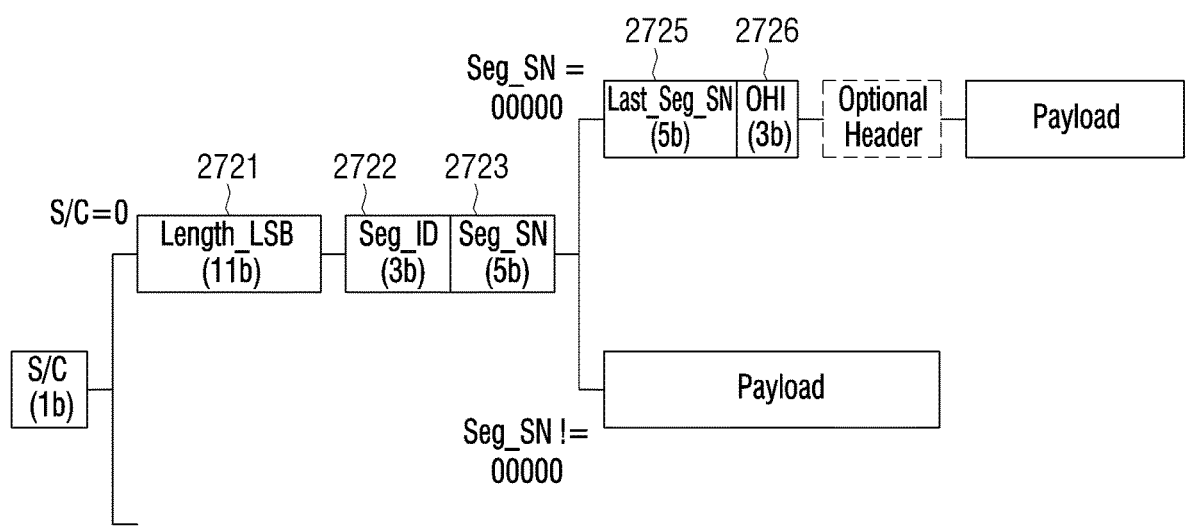

FIGS. 20A and 20B illustrate various exemplary embodiments of a case in which the Seg SN and the Seg_ID are used together among options for implementing the segmentation mode, and the maximum length of the payload is 2,047 bytes.

FIG. 20A illustrates a structure of a header of an ALP packet, according to an exemplary embodiment.

A Seg_ID field 2712 provides an identifier of a segmented L3 packet. For example, the Seg_ID field 2712 may be implemented as a 2-bit field. In this case, all ALP packets including the segment from the same L3 packet have the same Seg ID.

The use of a Length_LSB field 2711, a Seg_SN 2713, and an LI field 2714 is the same as the exemplary embodiment illustrated in FIG. 18A.

Values of a Last_Seg_SN field 2715 and an OHI field 2716 are shown only when a value of the Seg_SN field 2713 is "00000", and the use of these fields is the same as the exemplary embodiment illustrated in FIG. 18C.

FIG. 20B illustrates a structure of a header of an ALP packet, according to another exemplary embodiment.

Figure 27A:
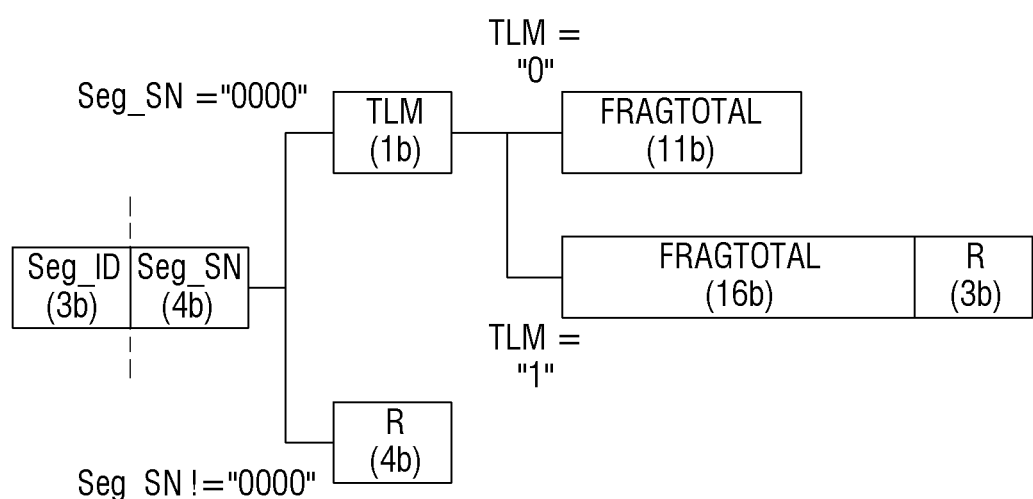

The exemplary embodiment of FIG. 20B is the same as an exemplary embodiment illustrated in FIG. 27A except the LI field is not present and the length of a Seg_ID field 2722 is extended in order to support more segmented L3 packets. As a result, the use of a Length_LSB field 2721, a Seg_SN 2723, a Last_Seg_SN field 2725, and an OHI field 2726 is the same as the exemplary embodiment illustrated in FIG. 20A.

Figure 21:
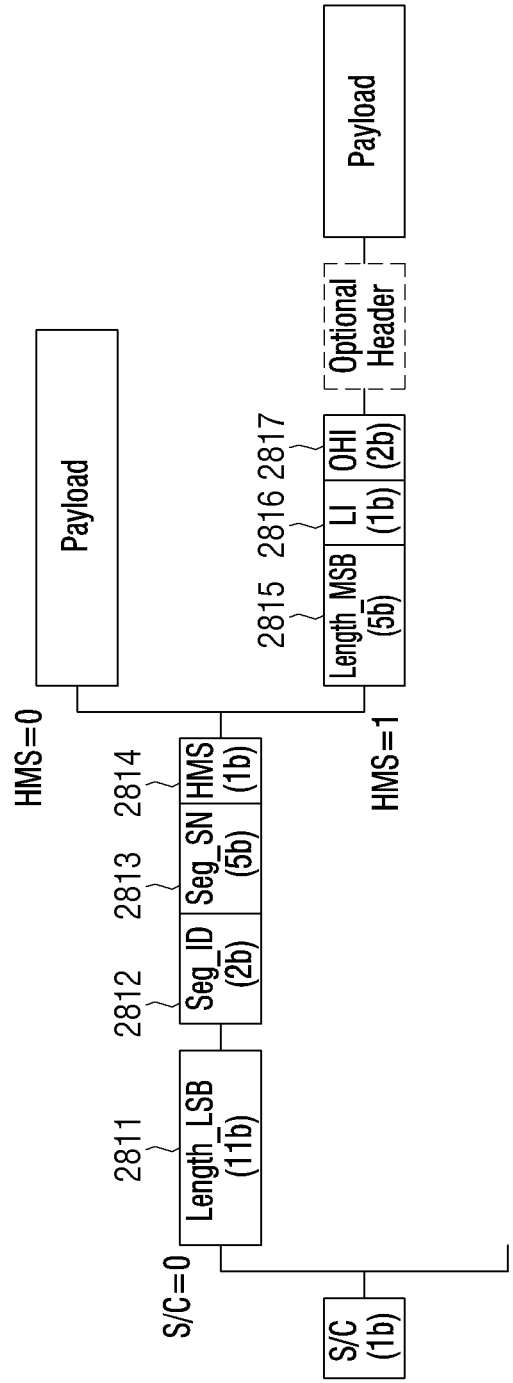

FIG. 21 illustrates an exemplary embodiments of a case in which the Seg SN and the Seg_ID are used together among options for implementing the segmentation mode, and the maximum length of the payload is 65,535 bytes.

An HMS field 2814 is shown when a predetermined feature, for example, a long ALP packet or an optional header is used or a current ALP packet includes the last segment of an L3 packet. For example, the HMS field 2814 may be implemented as a 1-bit field. In this case, the value of "0" is not used for all of the features and represents that the length of the current ALP packet is 3 bytes. The value of "1" represents that at least one of the features is used, and, in this case, an additional header after the HMS field continuously starts together with, for example, a 1 byte signaling the use of a long SDU optional header feature or including the last segment of the L3 packet.

The use of a Length_LSB field 2811, a Seg_SN 2812, and a Seg_SN field 2813 is the same as the exemplary embodiment illustrated in FIG. 20A.

Values of a Length_MSB field 2815, an LI field 2816, and an OHI field 2817 are shown only when a value of the HMS field 2814 is "1", and the use of these fields is the same as the aforementioned exemplary embodiments.

In yet another exemplary embodiment, an LI field 2816 may be omitted as an OHI field 2817 is implemented as 3 bits and a Last_Seg_SN field may be shown when the Seg_SN field 2813 is "00000".

[Concatenation Mode]

Figure 22:
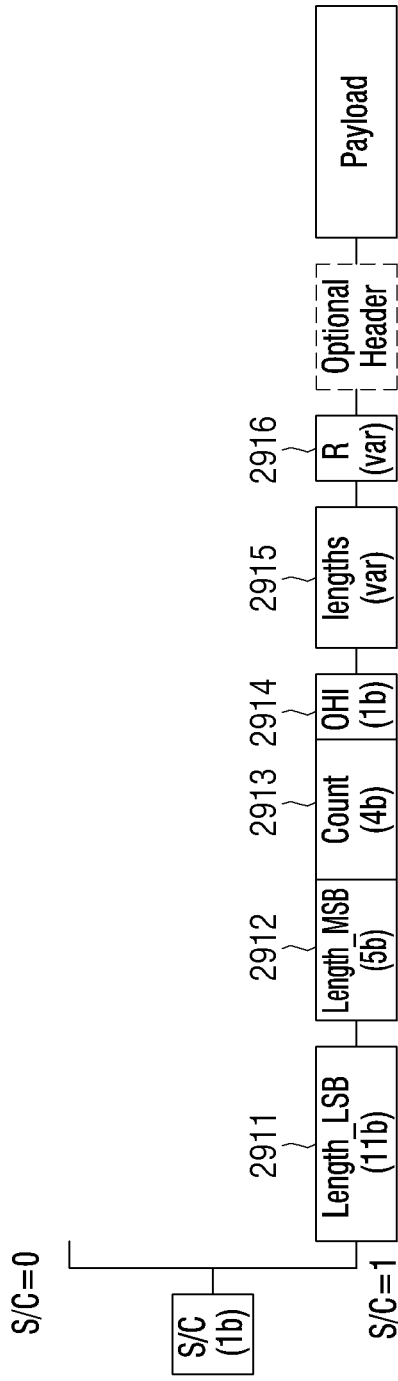

FIG. 22 illustrates a structure of an ALP packet for implementing a concatenation mode, according to an exemplary embodiment. The exemplary embodiment illustrated in FIG. 22 describes about a case in which the maximum payload length is 65,535 bytes.

A Length_LSB field 2911 indicates LSBs of the payload length (bytes) in a current ALP packet. For example, the Length_LSB field 2911 may be implemented as an 11-bit field. The Length_LSB field 2911 is connected with a subsequent Length_MSB field 2912 to provide the actual total length (bytes) of the payload in the current ALP packet.

The Length_MSB field 2912 provides the payload length (bytes) of 5 MSB in the current ALP packet. For example, the Length_MSB field 2912 may be implemented as a 5-bit field. The Length_MSB field 2912 is connected with the Length_LSB field 2911 having the length of 11 bits in order to form a 16-bit length field providing the total length of the payload data. As a result, the total length of the payload data is equal to 65535 ($=2^{16}-1$) bytes.

A Count field 2913 provides the number of L3 packets included in a corresponding BBP. For example, the Count field 2913 may be implemented as a 4-bit field. The actual number of L3 packets in the current ALP packet is given as the value of the Count field 2913+1.

An OHI field 2914 indicates whether an additional header is present. For example, the OHI field 2914 may be implemented as a 1-bit field.

The length of a lengths field 2915 is given as 11*Count 2913 bits. Each 11-bit field provides the length of an L3 packet connected to the payload of the current ALP packet.

Some bits constituting an R field 2916 are reserved to array a boundary with bytes.

Figure 23A:
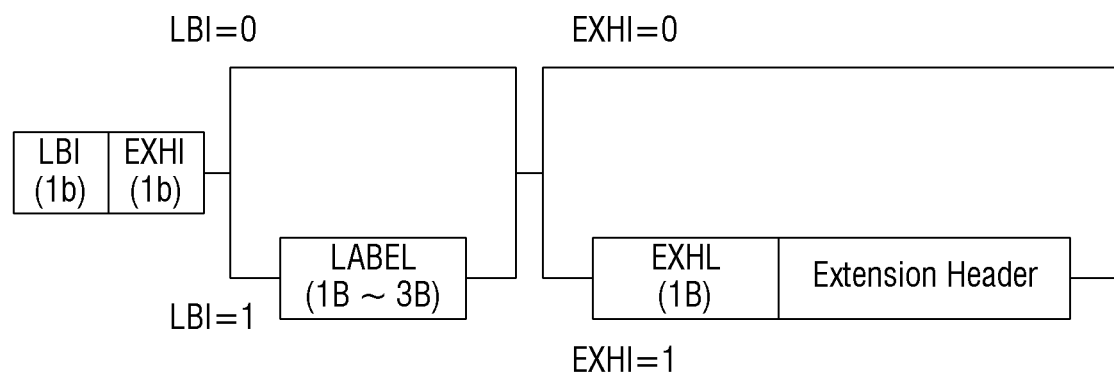
Figure 23B:
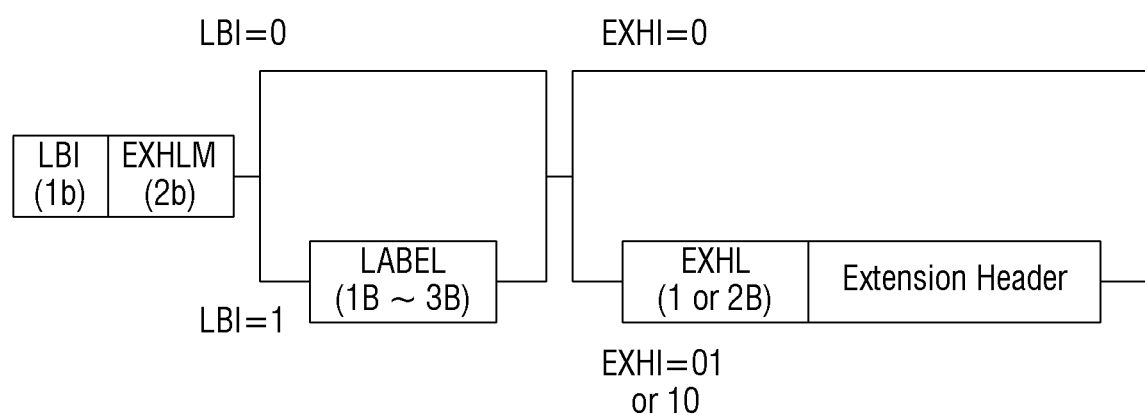
Figure 23C:
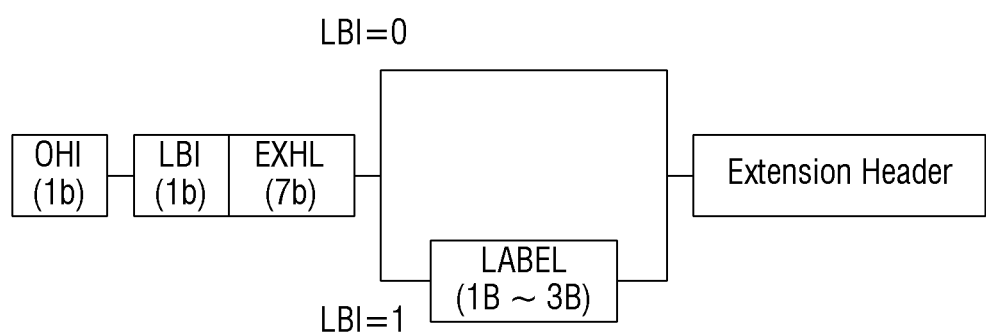

FIGS. 23A to 23C are diagrams illustrating constitutions of an OHI field and an Optional Header field, according to exemplary embodiments.

An OHI field may include at least one of a LABELI field, an EXHI field, an EXHLM field, and an HCM field.

The LABELI field indicates whether a LABEL field is present in an optional header. For example, the LABELI field may be implemented as a 1-bit field. Herein, the value of "0" represents that the LABEL field is not present, while the value of "1" represents that the LABEL field is present. The length of the LABEL field may be 1, 2 or 3 bytes.

The EXHI field indicates whether an extension header is present after the optional header. For example, the EXHI field may be implemented as a 1-bit field. Herein, the value of "1" represents that the extension header is present, while the value of "0" represents that the extension header is not present.

The EXHLM field indicates whether the length of the extension header is long or short when the extension header is present. For example, the EXHLM field may be implemented as a 2-bit field. In this case, the value of "00" represents that the extension header is not present, the value of "01" represents that a short extension header length (EXHL) field is present having a size of 8 bits, and the value of "10" represents that a long extension header length (EXHL) field having a size of 16 bits is present. The EXHL field is signaled next to the optional header.

The HCM field is shown when additional information for header compression is present in the optional header of the current BBP. For example, the HCM field may be implemented as a 1-bit field.

The Optional Header field may include at least one of the LABEL field, an EXHL field, and an HCl field.

The LABEL field provides a substream address which may be used for hardware/software filtering. For example, the LABEL field may be implemented as a 16-bit field.

The EXHL field provides the length (bytes) of the extension header next to the optional header. For example, the EXHL field may be implemented as an 8 or 16-bit field. The length of the corresponding field is 8 bits when a value of EXTHLM is "0" and 16 bits when the value of EXTHLM is "1".

The HCl field includes additional information for restoring a compressed SDU header transmitted in a current ALP packet.

FIG. 24 is a diagram illustrating syntax of a header of an ALP packet structure, according to yet another exemplary embodiment.

As illustrated in FIG. 24, a base header of an ALP packet header may include fields including TYPE, MODE, LENGM, LENGLSB, and the like, and, hereinafter, various exemplary embodiments of a structure of the ALP packet header including a plurality of fields will be described.

Figure 25:
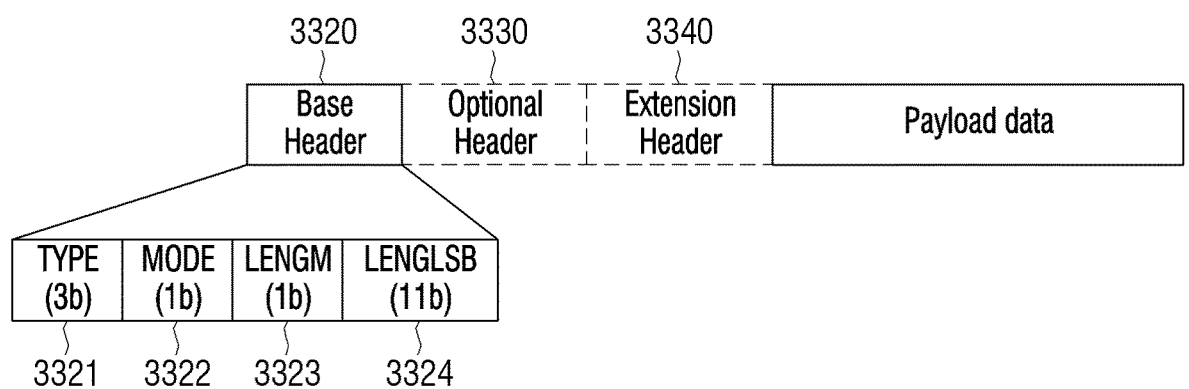

FIG. 25 is a diagram illustrating a structure of an ALP packet header, according to yet another exemplary embodiment.

As illustrated in FIG. 25, an ALP packet header includes a Base Header field 3320, an Optional Header field 3330, and an Extension Header field 3340.

In particular, the Base Header field 3320 may include a TYPE field 3321, a MODE field 3322, a LENGM field 3323, and a LENGLSB field 3324.

The TYPE field 3321 indicates a type of payload data. For example, the TYPE field 3321 may be implemented as a 3-bit field. For example, 000 represents IPv4, 001 represents IPv6, 010 represents compressed IPv4, 011 represents compressed IPv6, 100 represents signaling, 101 represents an MPEG-2 transmission stream, and 110 to 111 represent reserved.

The MODE field 3322 indicates whether any feature of an additional header, for example, labeling, segmentation, concatenation, or header extension is used. For example, the MODE field 3322 may be implemented as a 1-bit field. In this case, the value of "0" represents that any one of the features is not used. On the contrary, the value of "1" represents that at least one of the features is used. In this case, an additional header after the Base Header 3320 continuously starts together with a 1 byte signaling the use of labeling, segmentation, concatenation, and header extension.

The LENGM field 3323 indicates whether a current ALP packet is short or long. For example, the LENGM field 3323 may be implemented as a 1-bit field. In this case, the value of "0" represents the short L2 payload length shorter than $2^{11}=2048$ bytes, while the value of "1" represents the long L2 payload length which is 2048 bytes or more and 65,535 bytes or less.

The LENGLSB field 3324 represents the payload length (bytes) of 11 LSBs in a current L2 packet. When the LENGM field 3323 is 0, the LENGLSB field 3324 indicates the actual length (bytes) of the payload in the current L2 packet. On the contrary, the LENGLSB field 3324 is connected with a LENGMSB field in the Additional Header 3330 in order to provide the actual total length (bytes) of the payload in the current ALP packet.

Figure 26:
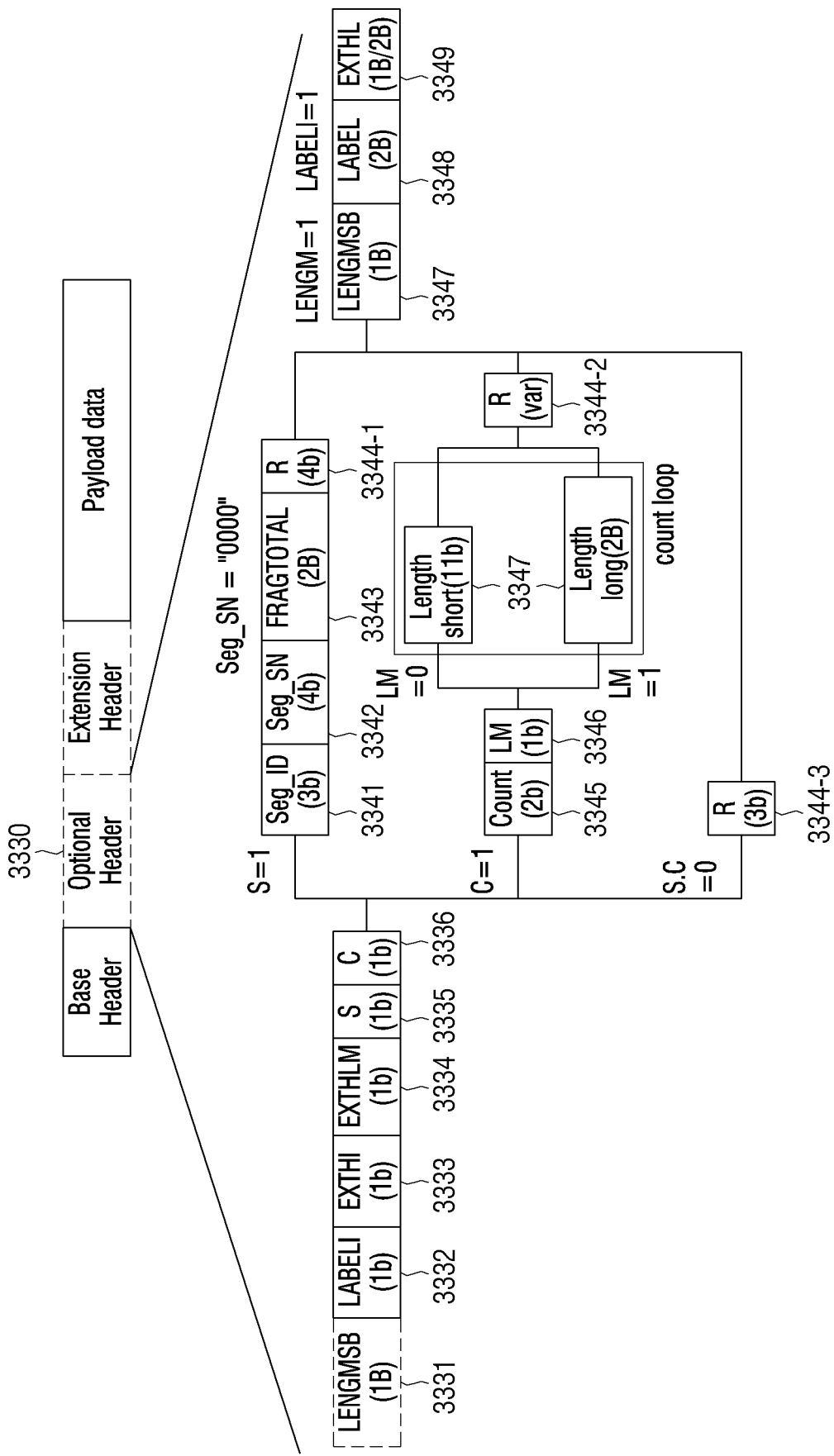

FIG. 26 is a diagram illustrating a structure of an optional field of an ALP packet header, according to yet another exemplary embodiment.

A LABELI field 3332 indicates whether a LABEL field is present in an additional header. For example, the LABELI field 3332 may be implemented as a 1-bit field. Herein, the value of "0" represents that the LABEL field is not present, while the value of "1" represents that the LABEL field is present. The length of the LABEL field may be 1, 2 or 3 bytes.

An EXHI field 3333 indicates whether an extension header is present after the additional header. For example, the EXHI field 3333 may be implemented as a 1-bit field. Herein, the value of "1" represents that the extension header is present, while the value of "0" represents that the extension header is not present.

An EXTHLM field 3334 indicates whether the length of the extension header is long or short when the extension header is present. For example, the EXHLM field 3334 may be implemented as a 1-bit field. In this case, the value of "0" represents that a short Extension Header length (EXHL) field having a size of 8 bits is present and the value of "1" represents that a long extension header length (EXHL) field having a size of 16 bits is present. The EXHL field is signaled next to an optional field.

An S field 3335 indicates whether a current ALP packet transmits a segment of an SDU. For example, the value of "1" represents that the payload of the current ALP packet transmits a segment of an SDU, while the value of "0" represents that the payload of the current ALP packet transmits a complete SDU.

A C field 3336 indicates whether the current ALP packet transmits a plurality of SDUs. The value of "1" represents that the current ALP packet transmits a plurality of SDUs and the value of "0" represents that the payload of the current ALP packet transmits one complete SDU.

Meanwhile, only when the S field 3335 is 1, a Seg_ID field 3341, a Seg_SN field 3342, and a FRAGTOTAL field 3343 are present.

The Seg_ID field 3341 provides an identifier for an SDU when a segment of the SDU is included in the payload of the current ALP packet. For example, the Seg_ID field 3341 may be implemented as a 3-bit field. All ALP packets including a segment that belongs to a same SDU may include the same Seg_ID. the Seg_ID is not used again until the last segment of the SDU is transmitted.

The Seg_SN field 3342 provides a segment identifier of an SDU transmitted in the current ALP packet. For example, the Seg_SN field 3342 may be implemented as a 4-bit field. As a result, a maximum of 16 segments may be supported.

The FRAGTOTAL field 3343 provides the total length (bytes) of a SDU segmented through a plurality of ALP packets. For example, the FRAGTOTAL field 3343 may be implemented as a 16-bit field. The corresponding field is used for checking a length after reassembly of different SDU segments from different ALP packets at a receiving end. The corresponding field is present only when the Seg_SN field 3342 is "0000".

On the other hand, only when the C field 3336 is 1, a Count field 3345, an LM field 3346, and a Length field 3347 are present.

The Count field 3345 provides the number of SDUs included in the corresponding ALP packet. For example, the Count field 3345 may be implemented as a 2-bit field. The actual number of SDUs in the current ALP packet is given as the value of the Count field 3345+1.

The LM field 3346 indicates a length indication mode for an SDU transmitted in the current ALP packet. The LM field 3346 may be implemented as a 1-bit field. When the LM field 3346 is "0", the length of a next length field is 11 bits and each SDU is shorter than 2048 bytes. On the contrary, when the LM field 3346 is "1", the length of the next length field is 2 bytes and each SDU is shorter than 65536 bytes.

The Length field 3347 provides the length of each SDU transmitted in the current ALP packet. The number according to one example in the corresponding field may be given as Count+1 (or, Count).

Further, extra padding may be added for byte alignment.

On the other hand, R fields 3344-1, 3344-2, and 3344-3 may be reserved for future use and implemented as, for example, a 4-bit field 3344-1, a variable bit field 3342, a 3-bit field 3344-3, and the like.

The LENGMSB field 3347 may be implemented as an 8-bit field providing 8 MSBs of the payload length in the current ALP packet. 3 MSBs in the LENGMSB field 3347 may be reserved for future use and set to "000". Residual 5 bits of LENGMSB are connected with LENGLSB of 11 bits in order to form a 16-bit LENG field and provides the total length of the payload data. The maximum length of the payload data is equal to 65535 (=$2^{16}$−1) bytes.

The LABEL field 3348 provides a substream address which may be used for hardware/software filtering. For example, the LABEL field may be implemented as a 16-bit field.

The EXTHL field 3349 provides the length (bytes) of an extension field next to the optional field. For example, the EXTHL field 3349 may be implemented as an 8 or 16-bit field. The length of the corresponding field is 8 bits when a value of EXTHLM is "0" and 16 bits when a value of EXTHLM is "1".

FIGS. 27A and 27B, 28A and 28B and 29 illustrate yet other exemplary embodiments of the optional field.

Figure 27B:
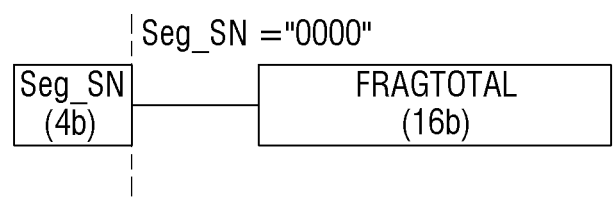

FIGS. 27A and 27B illustrate exemplary embodiment of an optional field structure in the segmentation mode, that is, when the S field 3335 is 1 in the exemplary embodiment illustrated in FIG. 26.

Figure 28A:
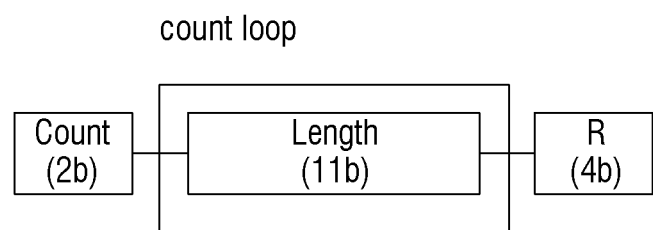
Figure 28B:
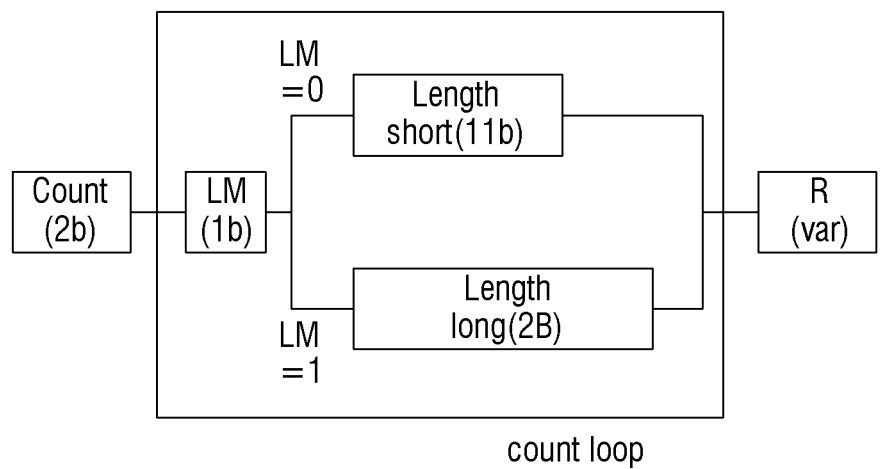

FIGS. 28A and 28B illustrate exemplary embodiment of an optional field structure in the concatenation mode, that is, when the C field 3336 is 1 in the exemplary embodiment illustrated in FIG. 26.

Figure 29:
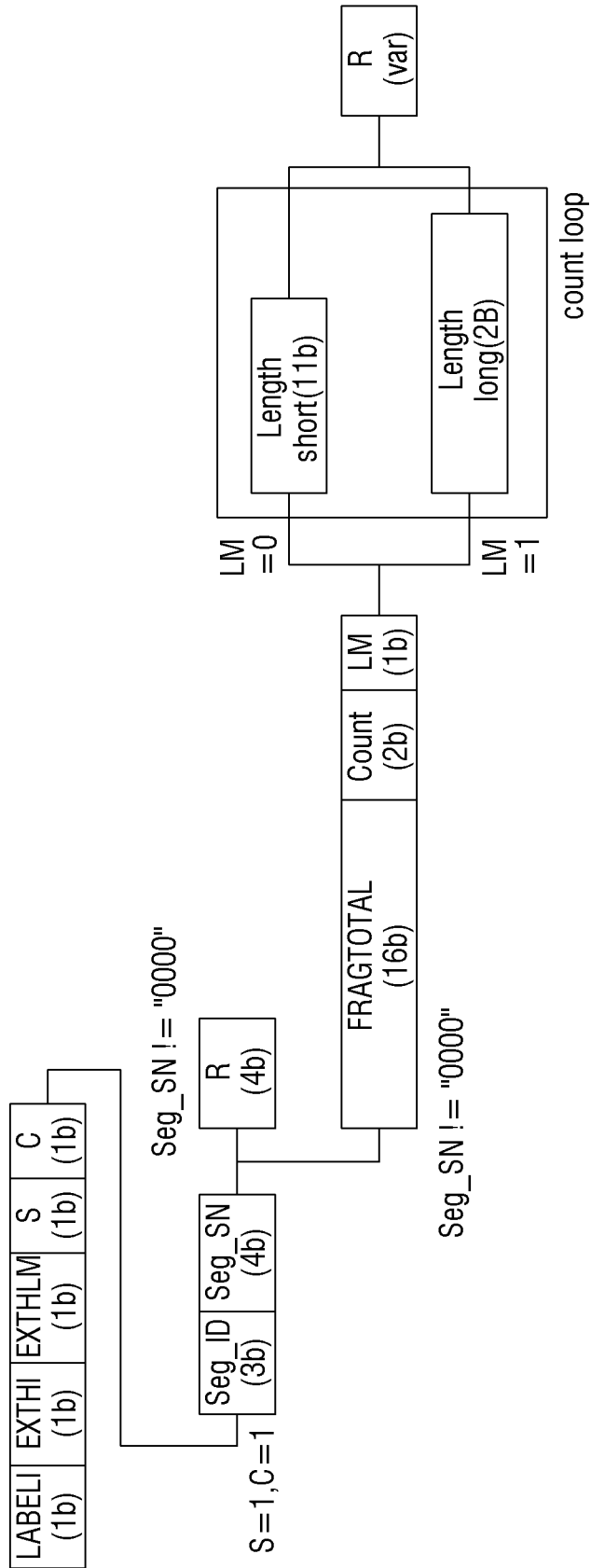

FIG. 29 illustrates an exemplary embodiment of an optional field structure having a form to support both the segmentation mode and the concatenation mode.

Functions of the respective fields illustrated in FIGS. 27A and 27B, 28A and 28B and 29 are the same as those described in FIG. 26, therefore, a detailed description will be omitted.

Figure 30:
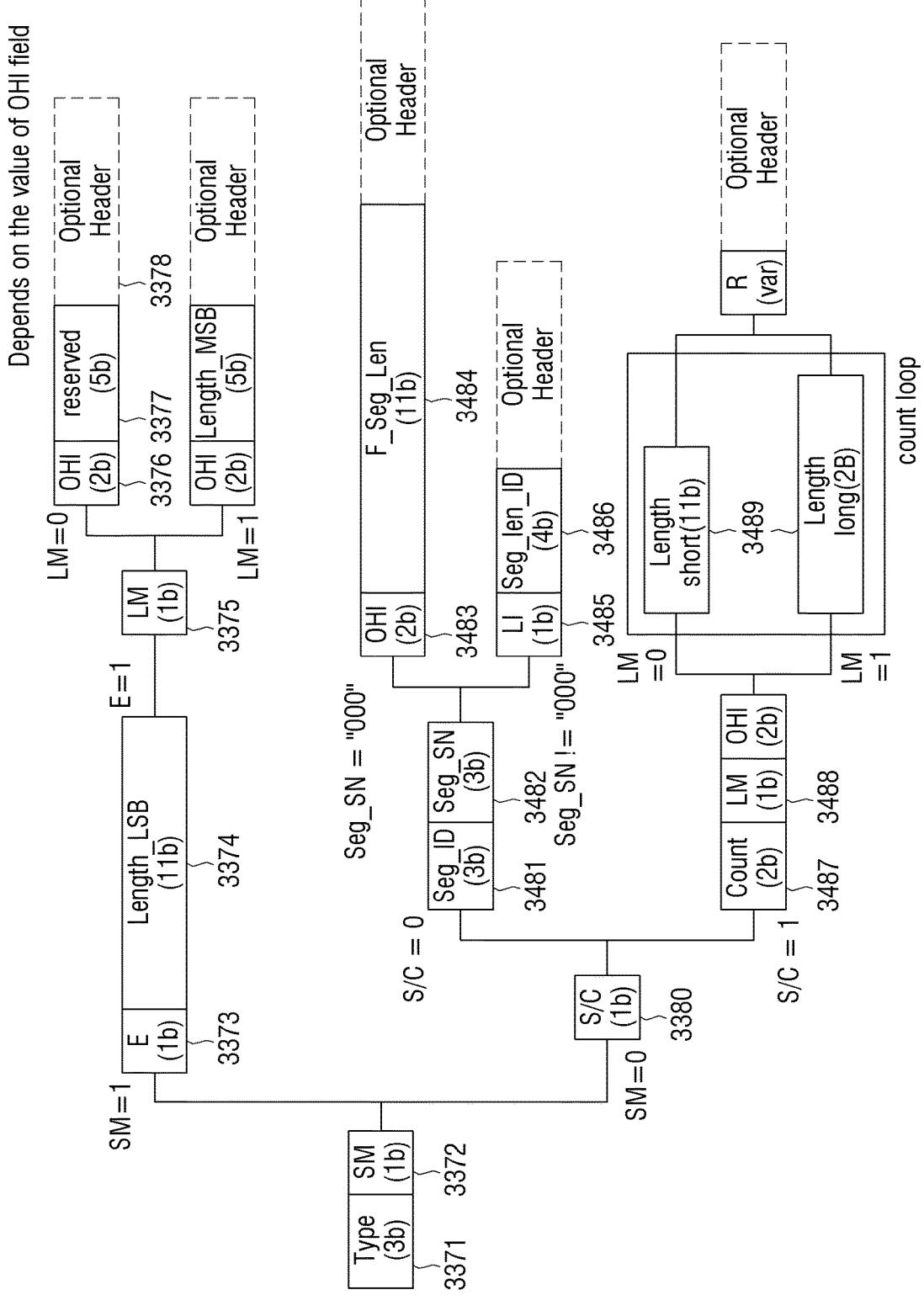

FIG. 30 is a diagram illustrating a structure of an ALP packet header, according to yet another exemplary embodiment.

A configuration TYPE field and an SM field illustrated in FIG. 30 are implemented as a common part.

A TYPE field 3371 indicates a type of payload data. For example, the TYPE field 3371 may be implemented as a 3-bit field, and 000 may represent IPv4, 001 may represent a compressed IPv4 packet, 010 may represent compressed IPv4, 011 may represent compressed IPv6, 100 may represent signaling, 101 may represent the MPEG-2 transmission stream, and 110 to 111 may represent reserved.

An SM field 3372 indicates whether a current ALP packet, that is, the ALP packet transmits one single complete L3 packet. For example, the SM field 3372 may be implemented as a 1-bit field, and, in this case, the value of "1" may represent that the payload of the current ALP packet transmits one single complete L3 packet, while the value of "0" may represent that the payload of the current ALP packet transmits a plurality of complete L3 packets or a segment of the L3 packet.

[Single Complete SDU Mode]

When the SM field 3372 is "1", the value of "1" represents a single complete SDU mode.

An E field 3373 indicates whether a predetermined feature, for example, a long SDU or an additional header is used. For example, the E field 3373 may be implemented as a 1-bit field. In this case, the value of "0" represents that the features are not used, and the value of "1" represents that at least one of the features is used. In this case, an additional header after the Length_LSB field continuously starts together with, for example, a Long SDU or a 1 byte signaling the use of an optional header feature.

A Length_LSB field 3374 represents the payload length (bytes) of 11 LSBs in the current ALP packet. For example, the Length_LSB field 3374 may be implemented as an 11-bit field. In this case, when an LM field 3375 is set to 0, the Length_LSB field 3374 indicates the actual length (bytes) of the payload in the current ALP packet. On the contrary, when the LM field 3375 is set to 1, the Length_LSB field 3374 is connected with the field Length_MSB in the additional header to provide the actual total length (bytes) of the payload in the current ALP packet.

The LM field 3375 indicates whether the length of the payload in the current ALP packet is short or long. The LM field 3375 may be implemented as, for example, a 1-bit field. In this case, the value of "0" represents a short L2 payload length shorter than $2^{11}$=2048 bytes, while the value of "1" represents a long L2 payload length which is 2048 bytes or more and 65,535 bytes or less.

An OHI field 3376 indicates whether a feature of a predetermined additional header, for example, labeling indicating a header compression mode or header extension is used. For example, the OHI field 3376 may be implemented as a 2-bit field.

A reserved field 3377 may be reserved for future use.

A length and a value of an Optional Header field 3378 may vary depending on a value of the OHI field.

Meanwhile, when the SM field 3372 is "0", the value of "0" represents the segmentation mode or the concatenation mode.

An S/C field 3480 indicates whether the payload of the current ALP packet transmits a segment of an SDU or a plurality of complete SDUs. For example, the S/C field 3480 may be implemented as a 1-bit field, and, in this case, the value of "0" may represent that the payload of the current ALP packet transmits a segment of an SDU, while the value of "1" may represent that the payload of the current ALP packet transmits a plurality of complete SDUs.

[Segmentation Mode]

A Seg_ID field 3481 provides an identifier for a segmented SDU when the segment of the SDU is included in the payload of the current ALP packet. For example, the Seg_ID field 3481 may be implemented as a 3-bit field. In this case, all ALP packets including a segment that belongs to a same SDU have a same Seg ID. The Seg_ID is not used again until the last segment of the SDU is transmitted.

A Seg_SN field 3482 provides a segment identifier of an SDU transmitted in the current ALP packet. For example, the Seg_SN field 3482 may be implemented as a 3-bit field, and, in this case, identifiers for a maximum of 8 segments may be provided.

An F_Seg_Len field 3484 may provide the length of the payload in the current ALP packet, and may be implemented as an 11-bit field. The corresponding field may be shown when the Seg_SN field 3482 is "0000".

An LI field 3485 indicates whether a segment of an SDU in the current ALP packet is the last segment. For example, the LI field 3485 may be implemented as a 1-bit field. In this case, the value of "0" represents that the segment of the SDU in the current ALP packet is not the last segment, and the value of "1" represents that the segment of the SDU in the current ALP packet is the last segment. The corresponding field may be shown when the Seg_SN field 3482 is "0000".

A Seg_Len_ID field 3486 may indicate the length of the payload in the current ALP packet, and, for example, may be implemented as a 3-bit field. A value of the corresponding field may be used to acquire an actual value from a predetermined table.

[Concatenation Mode]

A Count field 3487 provides the number of SDUs included in the corresponding ALP packet. For example, the Count field 3487 may be implemented as a 2-bit field. The actual number of SDUs in the current ALP packet is given as the value of the Count field 3487+1.

An LM field 3488 may indicates a length indication mode of an SDU transmitted in the current ALP packet, and, for example, may be implemented as a 1-bit field. In this case, the value of "0" represents that a next length field is 11 bits and each SDU is shorter than 2048 bytes. On the contrary, the value of "1" represents that the next length field is 2 bytes and each SDU is shorter than 65,536 bytes.

A Length field 3489 provides the length of each SDU transmitted in the current ALP packet. The number according to one example in the corresponding field may be given as Count+1 (alternatively, Count).

Further, extra padding may be added for byte alignment.

Figure 31:
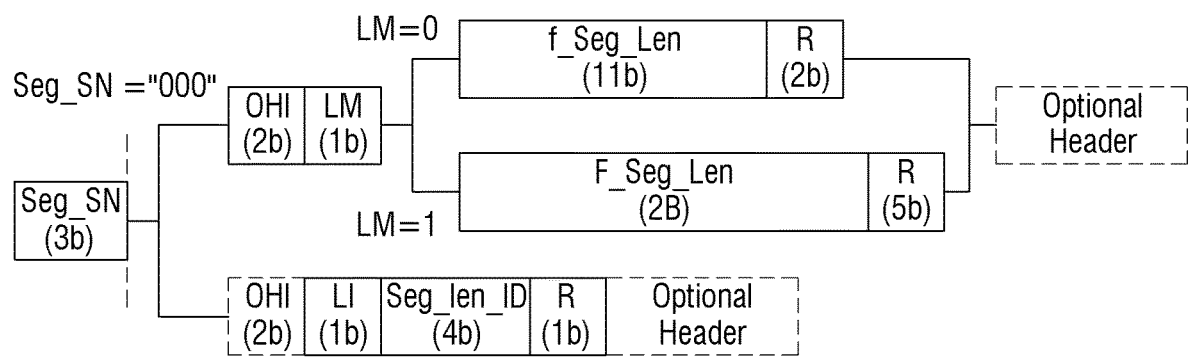
Figure 32A:
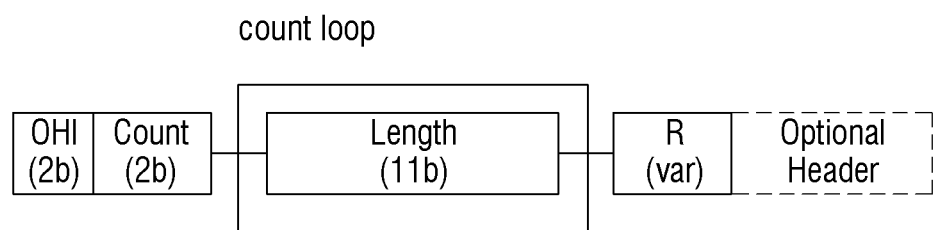
Figure 32B:
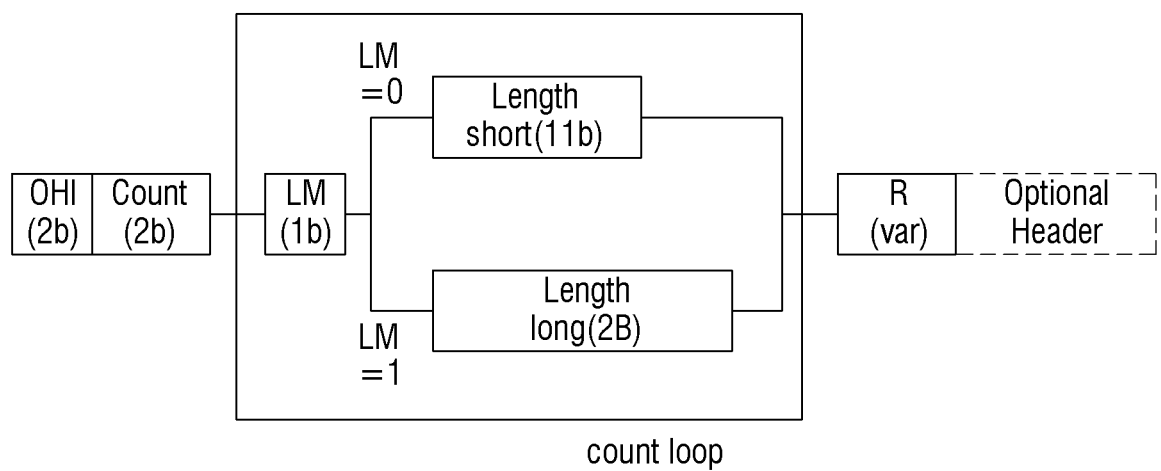

FIGS. 31, 32A and 32B illustrate yet another exemplary embodiment according to each mode of the structure of the ALP packet header illustrated in FIG. 30.

FIG. 31 illustrates an exemplary embodiment of a case in which the Seg ID field is not used in the segmentation mode.

Functions of the respective fields illustrated in FIG. 31 are the same as those described in FIG. 30, therefore, a detailed description will be omitted.

FIGS. 32A and 32B illustrate yet another exemplary embodiment in the concatenation mode.

Figure 37:
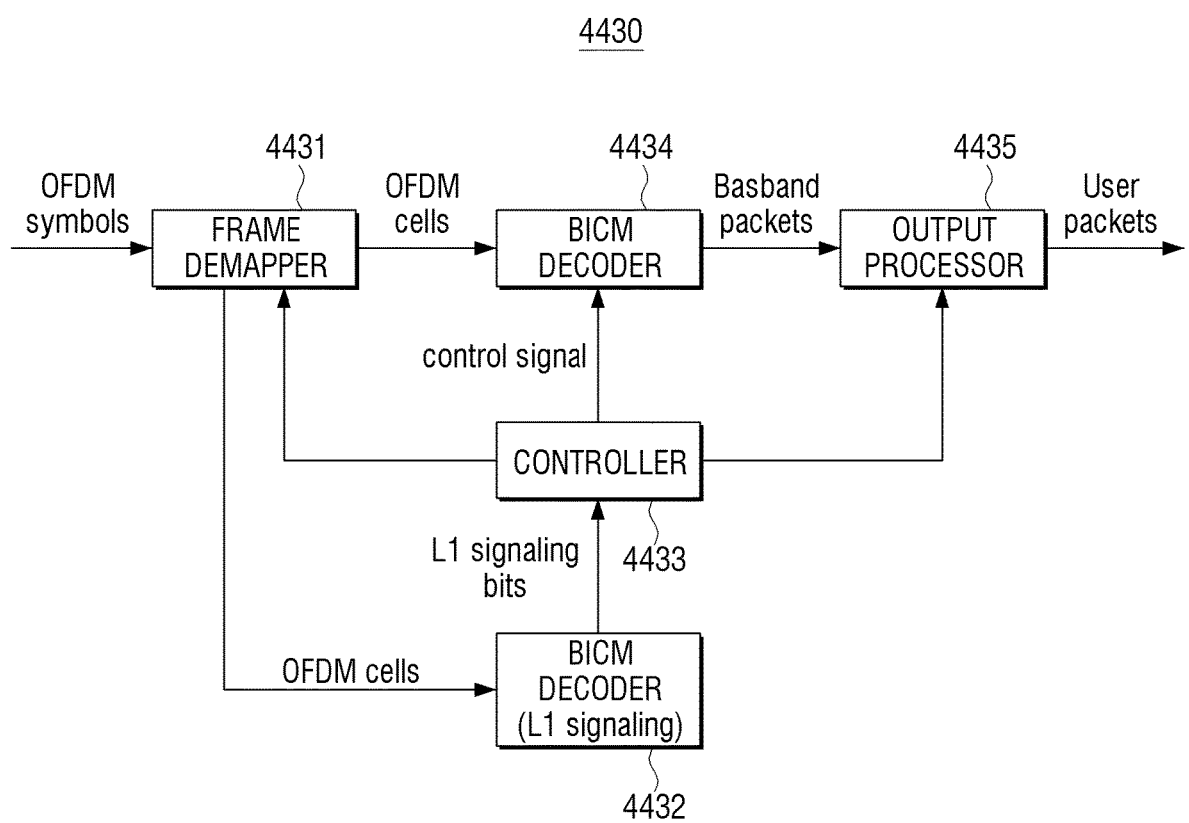
FIG. 37 is a block diagram illustrating a demodulator of FIG. 36, according to an exemplary embodiment in more detail.

Functions of the respective fields illustrated in FIGS. 32A and 32B are the same as those described in FIG. 37, therefore, a detailed description will be omitted.

Figure 33:
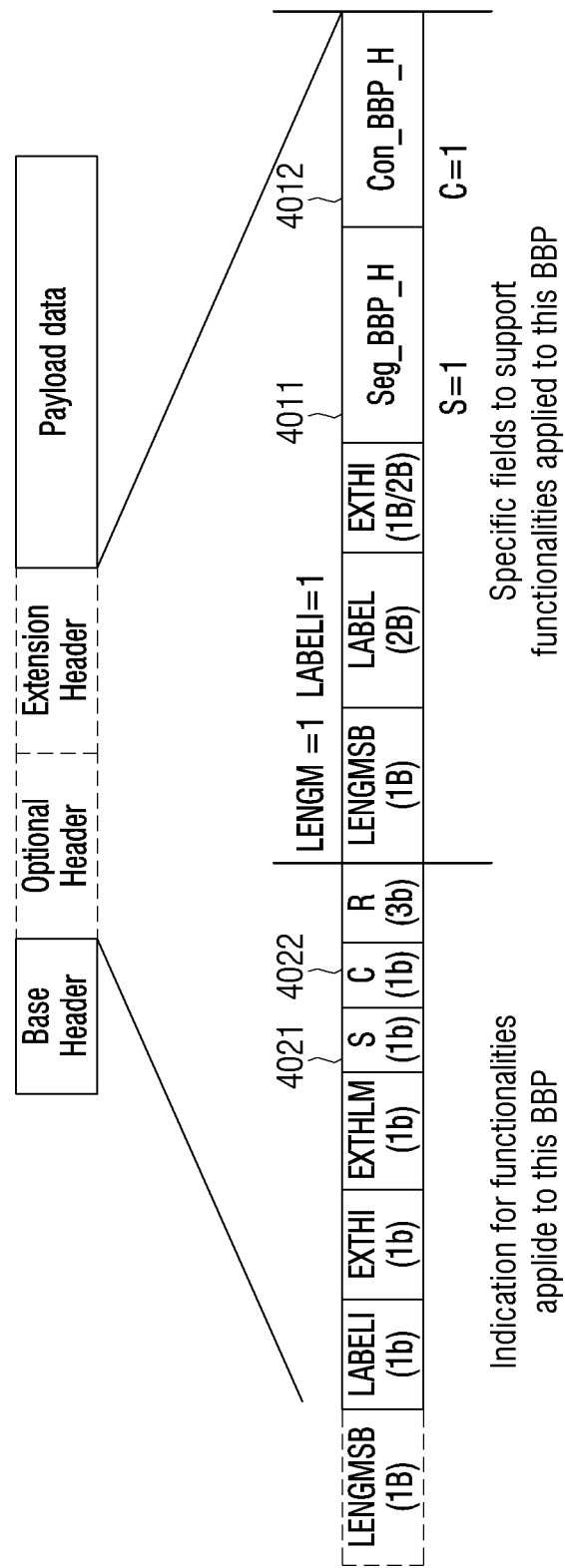

FIG. 33 is a diagram illustrating an optional header structure, according to yet another exemplary embodiment.

Among the components illustrated in FIG. 33, a Seg_BBP_H field 4011 is shown when an S field 4021 is 1. For example, the corresponding field indicates the length of an SDU before Seg_ID, Seg_SN, and segmentation.

A Con_BBP_H field 4012 is shown when a C field 4022 is 1. For example, the corresponding field indicates the number of SDUs concatenated in the current ALP packet and the lengths thereof. Besides, functions of the respective fields illustrated in FIG. 33 are the same as those described in FIG. 26, FIG. 30, and the like, therefore, a detailed description will be omitted.

Figure 35A:
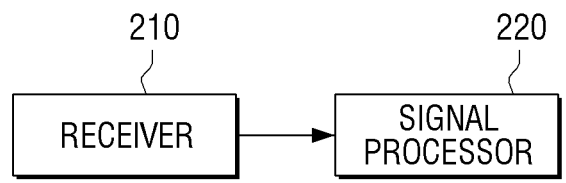
FIG. 35A is a block diagram illustrating a configuration of a receiving apparatus, according to an exemplary embodiment.

FIG. 35A is a block diagram of a receiving apparatus according to an exemplary embodiment.

Referring to FIG. 35A, the receiving apparatus 200 includes a receiver 210 and a signal processor 220.

The receiving apparatus 200 may be implemented to receive data from a transmitting apparatus which maps data in an incoming stream including only a first type stream to one or more signal processing paths and transmits the same. Thus, the receiving apparatus 200 may receive a transmission frame in which only the first type stream is mapped to one or more signal processing paths.

The receiver 210 receives a frame which includes data mapped to one or more signal processing paths. The receiver 210 may receive a stream which includes signaling information and data mapped to one or more signal processing paths. The signaling information may include information about an input type of an incoming stream received at the receiving apparatus and information about a data type mapped to one or more signal processing paths. The information about an input type of an incoming stream may indicate whether all signal processing paths within the frame is a same input type. The other information included in the signaling information is described above, which will not be further explained.

The signal processor 220 extracts signaling information from the received frame. The signal processor 220 may obtain various pieces of information about a PLP included in an L1 pre-signaling area and an L1 post-signaling area by extracting and decoding L1 signaling information. Further, the signal processor 230 may signal-process the frame based on the extracted and decoded signaling information. For example, the signal-processing may perform demodulating, frame de-building, BICM decoding, and input de-processing.

Specifically, the signal processor 220 generates a baseband packet by signal-processing the received frame from the receiver 210, and extracts header information from a plurality of ALP packets included in the baseband packet.

Further, the signal processor 220 may restore the stream, i.e., the incoming stream described above as being input to the transmitting apparatus by signal-processing payload data included in the ALP packets.

Figure 35B:
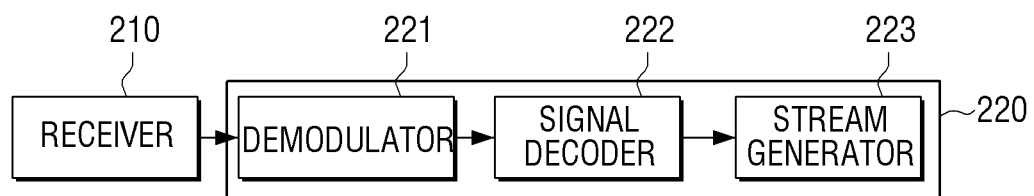
FIG. 35B is a block diagram illustrating a signal processor, according to an exemplary embodiment in detail.

FIG. 35B is a block diagram provided to explain in detail the signal processor, according to an exemplary embodiment.

Referring to FIG. 35B, the signal processor 220 includes a demodulator 221, a decoder 222 and a stream generator 223.

The demodulator 221 performs demodulation according to OFDM parameters from the received RF signals, performs sync-detection, and recognizes whether the currently received frame includes necessary service data based on the signaling information stored in a sync area, when the sync is detected. For example, the demodulator 221 may recognize whether a mobile frame is received or a fixed frame is received.

In this case, if the OFDM parameters are not previously determined regarding a signaling area and a data area, the demodulator 221 may perform demodulation by obtaining the OFDM parameters regarding the signaling area and the data area stored in the sync area, and obtaining information about the OFDM parameters regarding the signaling area and the data area which are disposed right after the sync area.

The decoder 222 performs decoding of necessary data. In this case, the decoder 222 may perform decoding by obtaining parameters of an FEC method and the modulating method regarding the data stored in each data area based on the signaling information. Further, the decoder 222 may calculate positions of necessary data based on the data information included in a configurable field and a dynamic field. Thus, it may calculate which positions in the frame a requested PLP is transmitted.

The stream generator 223 may generate data to be served by processing a baseband packet input from the decoder 222.

For example, the stream generator 223 may generate an ALP packet from the baseband packet in which errors are corrected based on an input stream synchronizer (ISSY) mode, buffer size (BUFS), time to output (TTO) values and input stream clock reference (ISCR) values.

Specifically, the stream generator 223 may include de-jitter buffers. The de-jitter buffers may regenerate correct timing to restore an output stream based on the ISSY mode, BUFS, TTO values and ISCR values. Thereby, a delay for sync between a plurality of PLPs can be compensated.

Figure 34:
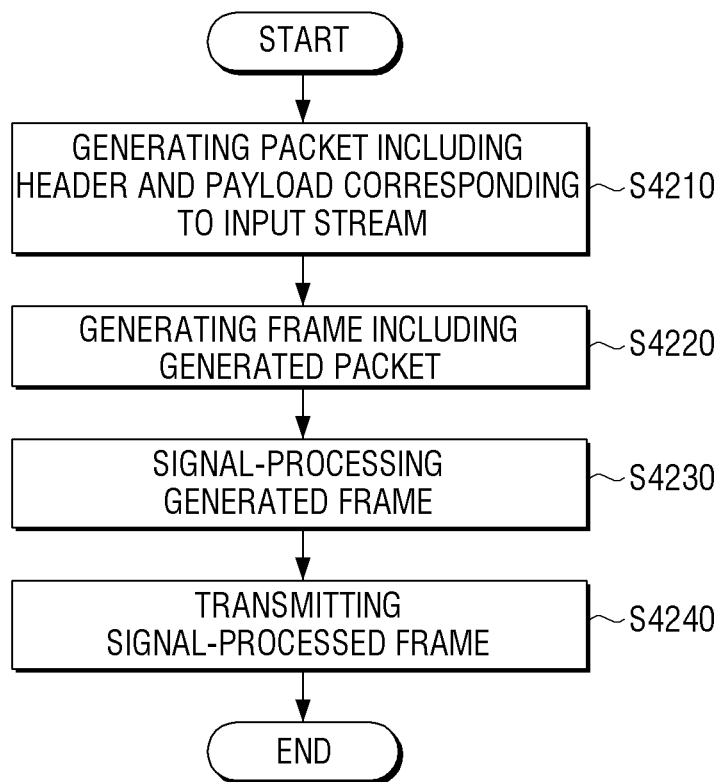
FIG. 34 is a flowchart illustrating a signal processing method in a transmitting apparatus according to an exemplary embodiment.

FIG. 34 is a flowchart provided to explain a signal processing method of a transmitting apparatus, according to an exemplary embodiment.

According to the signal processing method of the transmitting apparatus illustrated in FIG. 13, first, a header and payload data corresponding to an input stream are generated (S4210). Herein, a base header constituting the header may include a first field indicating a packet type of the input stream and a second field set to a first value representing that the packet transmits one single complete input packet or a second value representing that the packet transmits a segment of an input packet or a plurality of input packets. When the second field is set to the first value, the base header may include a third field which is set to a third value representing that an additional header is not present or a fourth value representing that the additional header is present. When the third field is set to the fourth value, the additional header may include a fourth field indicating whether a substream identifier is present in an optional header, and when the fourth field is set to a value representing that the substream identifier is present in the optional header, the optional header may include a fifth field indicating the substream identifier.

At S4220, a frame including the generated packet is generated. Here, the frame may be a baseband packet.

At S4230, the generated frame is signal-processed.

At S4240, the signal-processed frame is transmitted. Here, the signal-processed frame may be a transmission frame.

Figure 36:
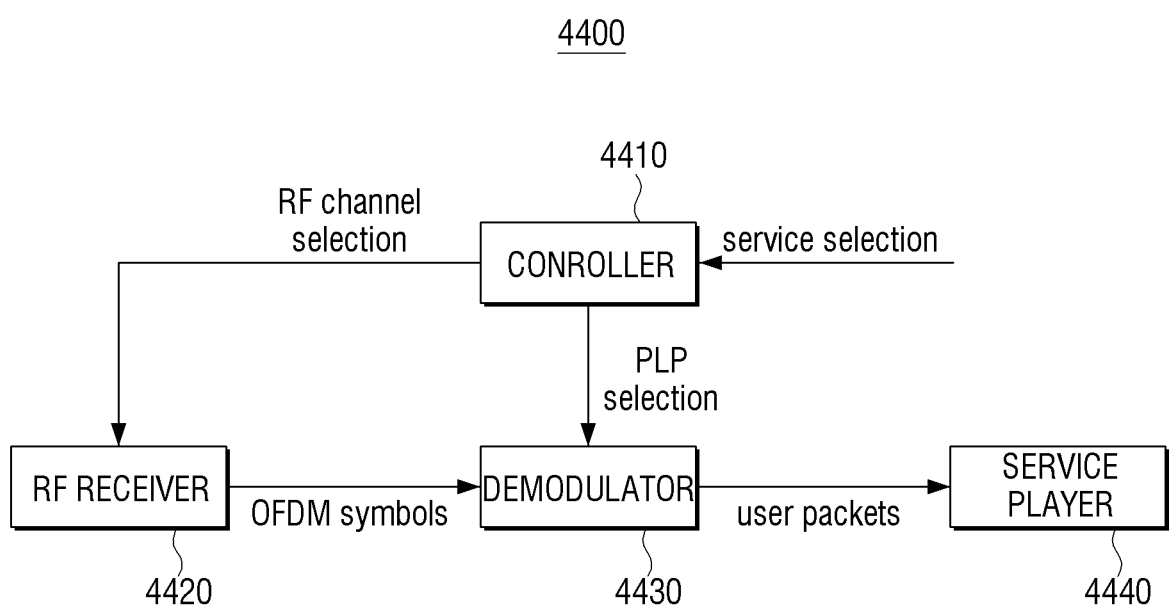
FIG. 36 is a block diagram illustrating a configuration of a receiver, according to an exemplary embodiment.

FIG. 36 is a block diagram of a receiving apparatus according to an exemplary embodiment.

Referring to FIG. 36, the receiving apparatus 4400 may include a controller 4410, an RF receiver 4420, a demodulator 4430, and a service player 4440.

The controller 4410 determines an RF channel and a PLP in which a selected service is transmitted. At this process, the RF channel may be defined by a center frequency and a bandwidth, and the PLP may be defined by a PLP identifier (ID). Certain services may be transmitted through more than one PLP belonging to more than one RF channel per component constituting services. However, it is assumed in the following descriptions that all data required for playing one service are transmitted through one PLP with one RF channel for convenient explanation. Thus, services are provided with a unique data obtaining path to play services, and the data obtaining path is specified by an RF channel and a PLP.

The RF receiver 4420 extracts RF signals from a selected RF channel by the controller 4410, and delivers OFDM symbols, extracted by performing signal-processing on the RF signals, to the demodulator 4430. The signal processing may include synchronization, channel estimation and equalization. Information required for the signal processing is predetermined between a transmitting apparatus and the receiving apparatus 4400 or transmitted to the receiving apparatus 4400 in a predetermined OFDM symbols among the OFDM symbols.

The demodulator 4430 extracts a user packet by performing signal processing on the OFDM symbols, and delivers to the service player 4440. The service player 4440 plays and outputs the service selected by a user with the user packet. A format of the user packet may be different according to implementing services. For example, a TS packet or an IPv4 packet may be the user packet.

FIG. 37 is a block diagram describing the demodulator of FIG. 36, according to an exemplary embodiment.

Referring to FIG. 37, the demodulator 4430 may include a frame demapper 4431, a BICM decoder 4432 for L1 signaling, a controller 4433, a BICM decoder 4434, and an output processor 4435.

The frame demapper 4431 selects OFDM cells constituting FEC blocks belonging to a selected PLP from a frame constituted by OFDM symbols based on controlling information delivered from the controller 4433, and delivers to the decoder 4434. Further, the frame demapper 4431 selects OFDM cells corresponding to more than one FEC block included in the L1 signaling, and delivers to BICM decoder 4432 for the L1 signaling.

The BICM decoder 4432 for the L1 signaling signal-processes OFDM cells corresponding to FEC blocks belonging to the L1 signaling, extracts L1 signaling bits, and delivers to the controller 4433. In this case, the signal processing may include extracting log-likelihood ratio (LLR) values for decoding low density parity check (LDPC) codes in OFDM cells, and decoding LDPC codes by using the extracted LLR values.

The controller 4433 extracts an L1 signaling table from the L1 signaling bits, and controls operations of the frame demapper 4431, the BICM decoder 4434, and the output processor 4435 by using values of the L1 signaling table. FIG. 37 illustrates that the BICM decoder 4432 for the L1 signaling does not use controlling information of the controller 4433 for convenient explanation. However, if the L1 signaling includes a layer structure similar to the L1 pre-signaling and the L1 post-signaling described above, the BICM decoder 4432 for the L1 signaling may be constituted by more than one BICM decoding block, and operations of the BICM decoding blocks and the frame demapper 4431 may be controlled based on upper-layer L1 signaling information, as understood in the above description.

The BICM decoder 4434 signal-processes OFDM cells constituting FEC blocks belonging to the selected PLP, extracts baseband packets, and delivers the baseband packets to the output processor 4435. The signal processing may include extracting LLR values for coding and decoding LDPC in OFDM cells, and decoding LDPC codes by using the extracted LLR values. These two operations may be performed based on the controlling information delivered from the controller 4433.

The output processor 4435 signal-processes the baseband packets, extracts a user packet, and delivers the extracted user packet to the service player. In this case, the signal processing may be performed on the controlling information delivered from the controller 4433.

Meanwhile, according to an exemplary embodiment, the output processor 1235 may include a ALP packet processor (not illustrated) which extracts an ALP packet from the baseband packet.

Figure 38:
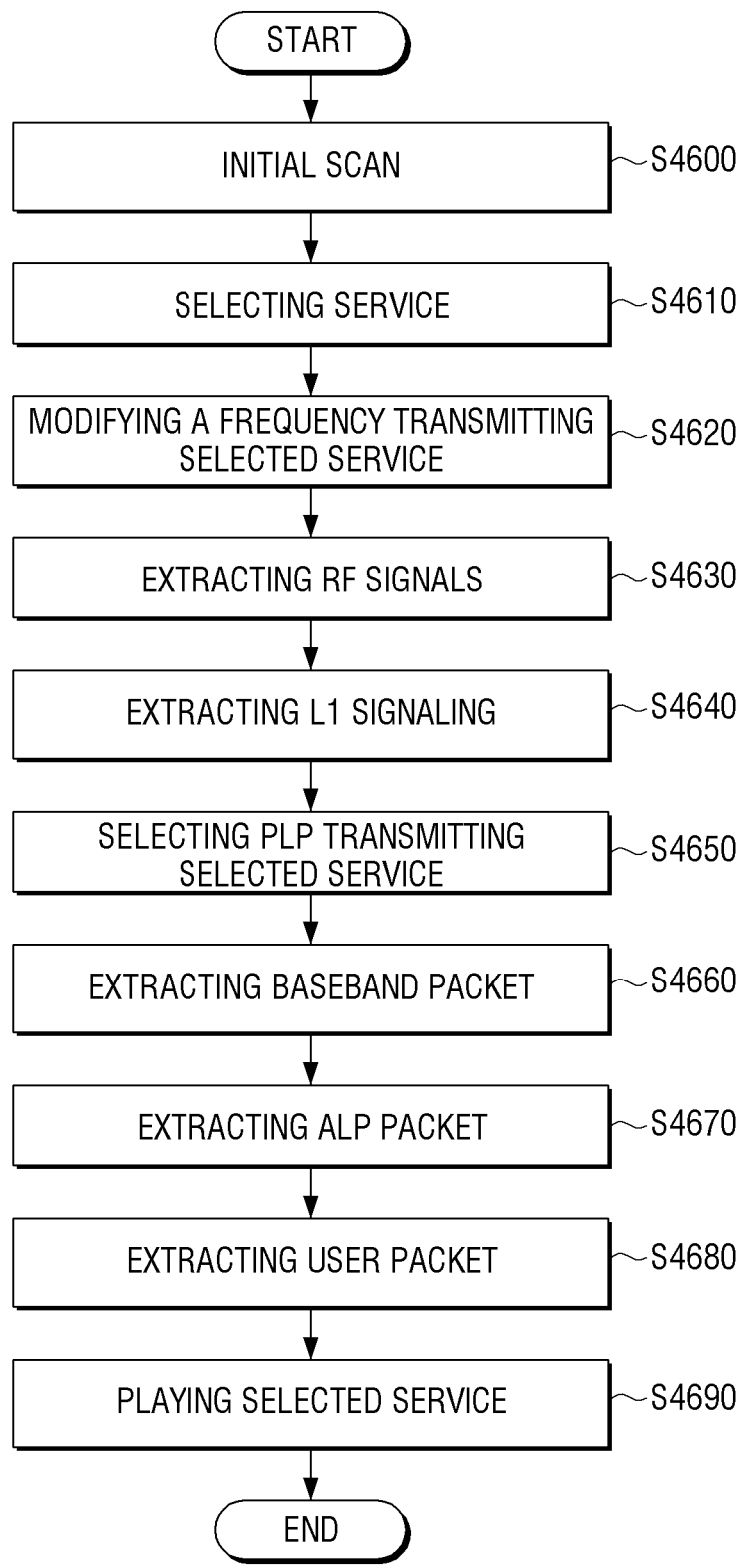
FIG. 38 is a flowchart schematically illustrating an operation of a receiver from the time when a user selects a service up to the time when the selected service is reproduced, according to an exemplary embodiment.

FIG. 38 is a flowchart provided to briefly explain an operation of a receiving apparatus from a time point when a user selects a service to a time point when the selected service is played.

It is assumed that service information about all services that can be selected at an initial scan process of S4600 is obtained prior to a service selection process at S4610. The service information may include information about an RF channel and a PLP which transmits data required for playing a specific service in a current broadcasting system. One example of the service information may be Program-Specific Information/Service Information (PSI/SI) of an MPEG-2 TS, which may be usually obtained through L2 signaling and an upper layer signaling.

When a user selects a service at S4610, the receiving apparatus modifies a frequency transmitting the selected service at S4620, and performs extracting RF signals at S4630. While performing the operation of modifying the frequency transmitting the selected service at S4620, the service information may be used.

When RF signals are extracted, the receiver performs extracting L1 signaling from the extracted RF signals at S4640. The receiving apparatus selects the PLP transmitting the selected service by using the extracted L1 signaling at S4650, and extracts baseband packets from the selected PLP at S4660. When selecting the PLP transmitting the selected service at S4650, the service information may be used.

Further, the operation of extracting the baseband frame at S4660 may include selecting OFDM cells belonging to the PLP by demapping a transmission frame, extracting LLR values for coding/decoding LDPC, and decoding LDPC codes by using the extracted LLR values.

The receiving apparatus performs extracting an ALP packet from the extracted baseband packet by using header information about the extracted baseband packet at S4670, and performs extracting a user packet from the extracted ALP packet by using header information about the extracted baseband packet at S4680. The extracted user packet is used for playing the selected service at S4690. When the operation of extracting the ALP packet at S4670 and the operation of extracting the user packet at S4680, L1 signaling information obtained by the operation of extracting the L1 signaling at S4640 may be used. In this case, a process of extracting the user packet from the ALP packet (restoring null TS packet and inserting TS sync byte) is the same as described above. According to the various exemplary embodiments as described above, various types of data may be mapped to the transmittable physical layer and data processing efficiency may be improved.

According to the various exemplary embodiments, the packet is filtered in the link layer to improve the data processing efficiency.

The above-describe methods and/or operations may also be implemented as a computer readable code in a computer readable recording medium. The computer readable recording medium is a predetermined data storage device capable of storing data which is readable by a computer system. Examples of the computer readable recording medium may include a read-only memory (ROM), a random-access memory (RAM), CD-ROMs, magnetic tapes, floppy disks, optical data storage devices, and carrier waves (such as data transmission through the Internet). The computer readable recording medium may also be distributed through computer systems connected through a network, and as a result, the computer readable code is stored and executed in a distribution method. Further, functional programs, codes, and code segments for achieving the present disclosure can be easily analyzed by programmers skilled in the art to which the present disclosure is applied.

At least one of the components, elements, modules or units represented by a block as illustrated in the drawings such as FIGS. 6, 13, 35A, 35B, 36 and 37 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Accordingly, the present disclosure includes a program including a code for implementing an apparatus and a method described in any claims of the specification and a machine (computer) readable storage medium storing the program. Further, the program may be electronically carried through a predetermined medium such as a communication signal transferred through wired or wireless connection and the present disclosure appropriately includes equivalents thereto.

Further, the apparatus according to the exemplary embodiment can receive and store a program from a program providing device connected in a wired or wireless method. The program providing device may include a program including instructions for allowing a program processing device to perform a predetermined content protecting method, a memory for storing information required for the content protecting method, and the like, a communicator for performing wired or wireless communication with the graphic processing device, and a controller transmitting a request from the graphic processing device or automatically transmitting the corresponding program to a transmitting/receiving apparatus.

Meanwhile, the detailed exemplary embodiments have been described, but various modifications can be made without departing from the scope of the inventive concept. Therefore, the scope of the inventive concept should not be limited to the above exemplary embodiment and should be defined by the appended claims and equivalents to the appended claims.

What is claimed is:

1. A transmitting method of a transmitting apparatus, the transmitting method comprising:
generating a packet comprising a header and a payload;
generating a frame comprising the generated packet; and
transmitting the generated frame,
wherein the header comprises a base header and an additional header,
wherein the base header comprises a first field and a second field,
wherein the first field comprises a value indicating a packet type of an input packet,
wherein the second field comprises a first value or a second value,
wherein the first value indicates that the packet carries a single, whole input packet,
wherein the second value indicates that the packet carries a part of an input packet or a plurality of input packets, and
wherein the additional header comprises a third field which comprises a value indicating whether an option header for a sub-stream identification is present.

2. The transmitting method as claimed in claim 1, wherein the option header comprises a fourth field which comprises a value indicating a sub-stream identifier, and
wherein the sub-stream identifier is used to identify a sub-stream corresponding to a specific service in a stream carrying multiple services.

3. A receiving method of a receiving apparatus, the receiving method comprising:
receiving a frame which is generated based on a packet comprising a header and a payload; and
obtaining the packet from the frame and processing the payload based on the header included in the packet,
wherein the header comprises a base header and an additional header,
wherein the base header comprises a first field and a second field,
wherein the first field comprises a value indicating a packet type of an input packet,
wherein the second field comprises a first value or a second value,
wherein the first value indicates that the packet carries a single, whole input packet,
wherein the second value indicates that the packet carries a part of an input packet or a plurality of input packets, and
wherein the additional header comprises a third field which comprises a value indicating whether an option header for a sub-stream identification is present.

4. The receiving method as claimed in claim 3, wherein the option header comprises a fourth field which comprises a value indicating a sub-stream identifier, and
wherein the sub-stream identifier is used to identify a sub-stream corresponding to a specific service in a stream carrying multiple services.

* * * * *